US008334773B2

(12) United States Patent
Cova et al.

(10) Patent No.: US 8,334,773 B2
(45) Date of Patent: Dec. 18, 2012

(54) ASSET MONITORING AND TRACKING SYSTEM

(75) Inventors: Nicholas D. Cova, Salt Lake City, UT (US); Neil M. Smith, Palo Alto, CA (US)

(73) Assignees: Deal Magic, Inc., Edmonds, WA (US); Savi Technology, Inc., Alexandria, VA (US)

( * ) Notice: Subject to any disclaimer, the term of this patent is extended or adjusted under 35 U.S.C. 154(b) by 414 days.

(21) Appl. No.: 12/560,377

(22) Filed: Sep. 15, 2009

(65) Prior Publication Data

US 2011/0050423 A1 Mar. 3, 2011

Related U.S. Application Data

(60) Provisional application No. 61/237,936, filed on Aug. 28, 2009.

(51) Int. Cl.
*G08B 13/14* (2006.01)

(52) U.S. Cl. .................................................... 340/572.1

(58) Field of Classification Search .... 340/572.1–572.9, 340/10.1; 235/385; 705/9, 28
See application file for complete search history.

(56) References Cited

U.S. PATENT DOCUMENTS 690,191 A 12/1901 Saxe
3,993,987 A 11/1976 Stevens
4,233,595 A 11/1980 Landkammer
4,729,626 A 3/1988 Stieff
4,736,857 A 4/1988 Monico, Jr. et al.
5,151,684 A 9/1992 Johnsen
5,189,396 A 2/1993 Stobbe et al.
5,266,925 A 11/1993 Vercellotti et al.
5,483,666 A 1/1996 Yamada et al.
5,491,486 A 2/1996 Welles et al.
5,515,030 A 5/1996 Citron et al.
5,565,858 A 10/1996 Guthrie
5,656,996 A 8/1997 Houser
5,710,973 A 1/1998 Yamada et al.
5,752,218 A 5/1998 Harrison et al.
5,758,263 A 5/1998 Berger et al.
5,774,876 A 6/1998 Woolley et al.

(Continued)

FOREIGN PATENT DOCUMENTS

GB 2 368 174 A 4/2002

(Continued)

OTHER PUBLICATIONS

U.S. Appl. No. 13/569,862, filed Aug. 8, 2012, Cova et al.

(Continued)

*Primary Examiner* — Phung Nguyen
(74) *Attorney, Agent, or Firm* — Fish & Richardson P.C.

(57) ABSTRACT

Techniques for monitoring and tracking assets and providing notifications to users are disclosed. In one aspect, a request to track an asset and enterprise data describing the asset are received, a tag is selected to associate with the asset, an event notification is received from the tag, and a user notification is generated from the event notification and the enterprise data. In another aspect, a request for a tag is received, a tag is selected in response to the request, a tag is routed to the origin location for the tag, a notification is received that the tag has arrived at a destination location, and the tag is routed from the destination location to a tag pool.

11 Claims, 17 Drawing Sheets

U.S. PATENT DOCUMENTS

| | | | | |
|---|---|---|---|---|
| 5,798,460 | A | 8/1998 | Nakagawa et al. | |
| 5,815,407 | A | 9/1998 | Huffman et al. | |
| 5,827,965 | A | 10/1998 | Nakagawa et al. | |
| 5,861,810 | A | 1/1999 | Nguyen | |
| 5,959,529 | A | 9/1999 | Kail, IV | |
| 6,026,690 | A | 2/2000 | Nakagawa et al. | |
| 6,069,563 | A | 5/2000 | Kadner et al. | |
| 6,075,443 | A | 6/2000 | Schepps et al. | |
| 6,243,005 | B1 | 6/2001 | Haimovich et al. | |
| 6,249,252 | B1 | 6/2001 | Dupray | |
| 6,265,973 | B1 | 7/2001 | Brammall et al. | |
| 6,292,108 | B1 | 9/2001 | Straser et al. | |
| 6,420,971 | B1 | 7/2002 | Leck et al. | |
| 6,496,766 | B1 | 12/2002 | Bernold et al. | |
| 6,529,131 | B2 | 3/2003 | Wentworth | |
| 6,571,213 | B1 | 5/2003 | Altendahl et al. | |
| 6,727,817 | B2 | 4/2004 | Maloney | |
| 6,753,775 | B2 | 6/2004 | Auerbach et al. | |
| 6,778,083 | B2 | 8/2004 | Auerbach et al. | |
| 6,792,353 | B2 | 9/2004 | Lin | |
| 6,879,962 | B1 | 4/2005 | Smith et al. | |
| 6,927,688 | B2 | 8/2005 | Tice | |
| 6,965,313 | B1 | 11/2005 | Saylor et al. | |
| 6,972,682 | B2 | 12/2005 | Lareau et al. | |
| 6,990,335 | B1 | 1/2006 | Shamoon et al. | |
| 7,035,856 | B1 | 4/2006 | Morimoto | |
| 7,044,374 | B2 | 5/2006 | Allison et al. | |
| 7,072,668 | B2 | 7/2006 | Chou | |
| 7,098,784 | B2 | 8/2006 | Easley et al. | |
| 7,106,244 | B2 | 9/2006 | Hsu | |
| 7,113,090 | B1 | 9/2006 | Saylor et al. | |
| 7,136,830 | B1 | 11/2006 | Kuelbs et al. | |
| 7,136,832 | B2 | 11/2006 | Li et al. | |
| 7,164,986 | B2 | 1/2007 | Humphries et al. | |
| 7,193,557 | B1 | 3/2007 | Kovacich et al. | |
| 7,196,621 | B2 | 3/2007 | Kochis | |
| 7,212,829 | B1 | 5/2007 | Lau et al. | |
| 7,239,238 | B2 | 7/2007 | Tester et al. | |
| 7,257,397 | B2 | 8/2007 | Shamoon et al. | |
| 7,274,332 | B1 | 9/2007 | Dupray | |
| 7,275,651 | B2 | 10/2007 | Morales et al. | |
| 7,286,683 | B2 | 10/2007 | Hadell | |
| 7,298,327 | B2 | 11/2007 | Dupray et al. | |
| 7,312,752 | B2 | 12/2007 | Smith et al. | |
| 7,315,281 | B2 | 1/2008 | Dejanovic et al. | |
| 7,336,152 | B2 | 2/2008 | Horwitz et al. | |
| 7,336,170 | B2 | 2/2008 | Auerbach et al. | |
| 7,339,469 | B2 | 3/2008 | Braun | |
| 7,350,383 | B1 | 4/2008 | Kuo | |
| 7,382,251 | B2 | 6/2008 | Bohman et al. | |
| 7,385,500 | B2 | 6/2008 | Irwin | |
| 7,385,529 | B2 | 6/2008 | Hersh et al. | |
| 7,391,321 | B2 | 6/2008 | Twitchell, Jr. | |
| 7,394,361 | B1 | 7/2008 | Twitchell, Jr. | |
| 7,423,535 | B2 * | 9/2008 | Chung et al. | 340/572.4 |
| 7,467,032 | B2 | 12/2008 | Kane et al. | |
| 7,471,203 | B2 | 12/2008 | Worthy et al. | |
| 7,482,920 | B2 | 1/2009 | Joao | |
| RE40,642 | E | 2/2009 | Harrison et al. | |
| 7,498,938 | B2 | 3/2009 | Ulrich | |
| 7,499,997 | B2 | 3/2009 | Hancock et al. | |
| 7,525,484 | B2 | 4/2009 | Dupray et al. | |
| 7,536,321 | B2 | 5/2009 | Takahashi et al. | |
| 7,616,116 | B2 | 11/2009 | Ehrensvard et al. | |
| 7,623,033 | B2 | 11/2009 | Ainsworth et al. | |
| 7,639,131 | B2 | 12/2009 | Mock et al. | |
| 7,643,823 | B2 | 1/2010 | Shamoon et al. | |
| 7,652,576 | B1 | 1/2010 | Crossno et al. | |
| 7,668,532 | B2 | 2/2010 | Shamoon et al. | |
| 7,688,207 | B2 | 3/2010 | Fritchie et al. | |
| 7,707,076 | B1 | 4/2010 | Whiteley et al. | |
| 7,714,778 | B2 | 5/2010 | Dupray | |
| 7,724,138 | B2 | 5/2010 | Horwitz et al. | |
| 7,746,228 | B2 * | 6/2010 | Sensenig et al. | 340/572.1 |
| 7,760,103 | B2 | 7/2010 | Frank | |
| 7,764,231 | B1 | 7/2010 | Karr et al. | |
| 7,822,580 | B2 | 10/2010 | Mustonen | |
| 7,830,852 | B2 | 11/2010 | Twitchell, Jr. | |
| 7,853,480 | B2 | 12/2010 | Taylor et al. | |
| 7,864,061 | B2 | 1/2011 | Frank | |
| 7,903,029 | B2 | 3/2011 | Dupray | |
| 7,936,266 | B2 | 5/2011 | Francis et al. | |
| 7,937,244 | B2 * | 5/2011 | Kadaba | 702/184 |
| 7,973,536 | B2 | 7/2011 | Kojovic et al. | |
| 7,990,270 | B2 | 8/2011 | Mostov | |
| 7,990,947 | B2 | 8/2011 | Twitchell et al. | |
| 8,032,153 | B2 | 10/2011 | Dupray et al. | |
| 8,064,935 | B2 | 11/2011 | Shamoon et al. | |
| 8,068,023 | B2 | 11/2011 | Dulin et al. | |
| 8,082,096 | B2 | 12/2011 | Dupray | |
| 8,135,413 | B2 | 3/2012 | Dupray | |
| 8,164,458 | B2 | 4/2012 | Mostov | |
| 8,217,785 | B2 | 7/2012 | Steer | |
| 8,228,192 | B2 | 7/2012 | Eckert et al. | |
| 2001/0022558 | A1 | 9/2001 | Karr et al. | |
| 2002/0104013 | A1 | 8/2002 | Ghazarian | |
| 2002/0111819 | A1 | 8/2002 | Li et al. | |
| 2002/0113704 | A1 | 8/2002 | Hess | |
| 2003/0126024 | A1 | 7/2003 | Crampton et al. | |
| 2003/0137968 | A1 | 7/2003 | Lareau et al. | |
| 2003/0146871 | A1 | 8/2003 | Karr et al. | |
| 2003/0171948 | A1 | 9/2003 | Thomas et al. | |
| 2003/0195791 | A1 | 10/2003 | Waller et al. | |
| 2003/0222820 | A1 | 12/2003 | Karr et al. | |
| 2003/0227392 | A1 | 12/2003 | Ebert et al. | |
| 2003/0233189 | A1 | 12/2003 | Hsiao et al. | |
| 2004/0113933 | A1 | 6/2004 | Guler | |
| 2004/0124977 | A1 | 7/2004 | Biffar | |
| 2004/0126015 | A1 | 7/2004 | Hadell | |
| 2004/0183673 | A1 | 9/2004 | Nageli | |
| 2004/0198386 | A1 | 10/2004 | Dupray | |
| 2004/0199411 | A1 | 10/2004 | Bertram et al. | |
| 2004/0227630 | A1 | 11/2004 | Shannon et al. | |
| 2004/0246130 | A1 | 12/2004 | Lambright et al. | |
| 2004/0257225 | A1 | 12/2004 | Webb, Sr. et al. | |
| 2004/0266457 | A1 | 12/2004 | Dupray | |
| 2005/0055237 | A1 | 3/2005 | Schmidtberg et al. | |
| 2005/0091091 | A1 | 4/2005 | Bjerre et al. | |
| 2005/0156736 | A1 | 7/2005 | Rajapakse et al. | |
| 2005/0159883 | A1 | 7/2005 | Humphries et al. | |
| 2005/0190097 | A1 | 9/2005 | Hsu | |
| 2005/0219037 | A1 | 10/2005 | Huang et al. | |
| 2005/0248454 | A1 | 11/2005 | Hanson et al. | |
| 2005/0256731 | A1 | 11/2005 | Mougey et al. | |
| 2006/0047379 | A1 | 3/2006 | Schullian et al. | |
| 2006/0054705 | A1 * | 3/2006 | Garton et al. | 235/485 |
| 2006/0101897 | A1 | 5/2006 | Masuya et al. | |
| 2006/0105760 | A1 | 5/2006 | Shamoon et al. | |
| 2006/0109109 | A1 | 5/2006 | Rajapakse et al. | |
| 2006/0116893 | A1 | 6/2006 | Carnes et al. | |
| 2006/0145837 | A1 | 7/2006 | Horton et al. | |
| 2006/0155591 | A1 | 7/2006 | Altaf et al. | |
| 2006/0202824 | A1 | 9/2006 | Carroll et al. | |
| 2006/0229895 | A1 | 10/2006 | Kodger | |
| 2006/0232398 | A1 | 10/2006 | Nedblake et al. | |
| 2006/0238332 | A1 | 10/2006 | Carle et al. | |
| 2006/0255934 | A1 | 11/2006 | Easley et al. | |
| 2006/0276201 | A1 | 12/2006 | Dupray | |
| 2006/0288744 | A1 | 12/2006 | Smith | |
| 2007/0043538 | A1 | 2/2007 | Johnson et al. | |
| 2007/0046459 | A1 | 3/2007 | Silverman et al. | |
| 2007/0056369 | A1 | 3/2007 | Griffin et al. | |
| 2007/0115902 | A1 | 5/2007 | Shamoon et al. | |
| 2007/0120381 | A1 | 5/2007 | Ehrensvard et al. | |
| 2007/0145130 | A1 * | 6/2007 | Danilewitz | 235/385 |
| 2007/0150379 | A1 | 6/2007 | Vernaci et al. | |
| 2007/0155379 | A1 | 7/2007 | Shamoon et al. | |
| 2007/0167179 | A1 | 7/2007 | Shamoon et al. | |
| 2007/0182556 | A1 | 8/2007 | Rado et al. | |
| 2007/0222232 | A1 | 9/2007 | Held | |
| 2007/0222674 | A1 | 9/2007 | Tan et al. | |
| 2007/0252696 | A1 | 11/2007 | Belisle et al. | |
| 2007/0262861 | A1 | 11/2007 | Anderson et al. | |
| 2007/0285232 | A1 | 12/2007 | Bohman et al. | |
| 2007/0287473 | A1 | 12/2007 | Dupray | |
| 2008/0006696 | A1 | 1/2008 | Piersol et al. | |
| 2008/0040244 | A1 | 2/2008 | Ricciuti et al. | |

| | | | | |
|---|---|---|---|---|
| 2008/0042809 | A1 | 2/2008 | Watts et al. | |
| 2008/0086391 | A1 | 4/2008 | Maynard et al. | |
| 2008/0094209 | A1 | 4/2008 | Braun et al. | |
| 2008/0111693 | A1 | 5/2008 | Johnson et al. | |
| 2008/0113672 | A1 | 5/2008 | Karr et al. | |
| 2008/0133126 | A1 | 6/2008 | Dupray | |
| 2008/0143516 | A1 | 6/2008 | Mock et al. | |
| 2008/0143604 | A1 | 6/2008 | Mock et al. | |
| 2008/0150698 | A1 | 6/2008 | Smith et al. | |
| 2008/0157974 | A1 | 7/2008 | Boss et al. | |
| 2008/0167049 | A1 | 7/2008 | Karr et al. | |
| 2008/0186166 | A1 | 8/2008 | Zhou et al. | |
| 2008/0231459 | A1* | 9/2008 | Corder | 340/572.7 |
| 2008/0248813 | A1 | 10/2008 | Chatterjee et al. | |
| 2008/0252428 | A1 | 10/2008 | Robinson et al. | |
| 2008/0309487 | A1 | 12/2008 | Chao | |
| 2009/0030715 | A1 | 1/2009 | Robb et al. | |
| 2009/0060349 | A1 | 3/2009 | Linaker et al. | |
| 2009/0083123 | A1 | 3/2009 | Powell et al. | |
| 2009/0102657 | A1 | 4/2009 | Evans et al. | |
| 2009/0102660 | A1 | 4/2009 | Evans et al. | |
| 2009/0121877 | A1 | 5/2009 | Henderson | |
| 2009/0134999 | A1 | 5/2009 | Dobson et al. | |
| 2009/0135000 | A1 | 5/2009 | Twitchell, Jr. | |
| 2009/0135015 | A1 | 5/2009 | Dobson et al. | |
| 2009/0140886 | A1 | 6/2009 | Bender | |
| 2009/0146805 | A1 | 6/2009 | Joao | |
| 2009/0146832 | A1* | 6/2009 | Ebert et al. | 340/825.49 |
| 2009/0167536 | A1 | 7/2009 | Clark et al. | |
| 2009/0177394 | A1 | 7/2009 | Walz et al. | |
| 2009/0201169 | A1 | 8/2009 | d'Hont et al. | |
| 2009/0216775 | A1 | 8/2009 | Ratliff et al. | |
| 2009/0234493 | A1 | 9/2009 | Pandit et al. | |
| 2009/0308000 | A1 | 12/2009 | Corcoran | |
| 2009/0316682 | A1 | 12/2009 | Twitchell et al. | |
| 2009/0322510 | A1 | 12/2009 | Berger et al. | |
| 2009/0326971 | A1 | 12/2009 | Piccinini et al. | |
| 2010/0012653 | A1 | 1/2010 | Ulrich et al. | |
| 2010/0039284 | A1 | 2/2010 | Hall et al. | |
| 2010/0045436 | A1 | 2/2010 | Rinkes | |
| 2010/0066501 | A1 | 3/2010 | Ulrich et al. | |
| 2010/0066561 | A1 | 3/2010 | Ulrich et al. | |
| 2010/0073229 | A1 | 3/2010 | Pattabiraman et al. | |
| 2010/0076902 | A1 | 3/2010 | Kraft | |
| 2010/0090822 | A1 | 4/2010 | Benson et al. | |
| 2010/0095864 | A1 | 4/2010 | Forbes | |
| 2010/0102964 | A1* | 4/2010 | Steer | 340/572.1 |
| 2010/0116932 | A1 | 5/2010 | Helou, Jr. | |
| 2010/0141393 | A1 | 6/2010 | Daniel | |
| 2010/0141445 | A1 | 6/2010 | Subramaniyam et al. | |
| 2010/0145739 | A1 | 6/2010 | Erhart et al. | |
| 2010/0234045 | A1 | 9/2010 | Karr et al. | |
| 2010/0238032 | A1 | 9/2010 | Greene | |
| 2010/0277280 | A1 | 11/2010 | Burkart et al. | |
| 2010/0312715 | A1 | 12/2010 | Esque et al. | |
| 2011/0012731 | A1 | 1/2011 | Stevens | |
| 2011/0025496 | A1 | 2/2011 | Cova et al. | |
| 2011/0050397 | A1 | 3/2011 | Cova | |
| 2011/0050424 | A1 | 3/2011 | Cova et al. | |
| 2011/0054979 | A1 | 3/2011 | Cova et al. | |
| 2011/0120199 | A1 | 5/2011 | Auerbach et al. | |
| 2011/0128143 | A1 | 6/2011 | Daniel | |
| 2011/0133888 | A1 | 6/2011 | Stevens et al. | |
| 2011/0133932 | A1 | 6/2011 | Tan et al. | |
| 2011/0258930 | A1 | 10/2011 | Francis et al. | |
| 2011/0266338 | A1 | 11/2011 | Babcock et al. | |
| 2011/0283750 | A1 | 11/2011 | Will | |
| 2011/0289320 | A1 | 11/2011 | Twitchell et al. | |
| 2012/0058775 | A1 | 3/2012 | Dupray et al. | |
| 2012/0069131 | A1 | 3/2012 | Abelow | |
| 2012/0094638 | A1 | 4/2012 | Shamoon et al. | |
| 2012/0182180 | A1 | 7/2012 | Wolf et al. | |
| 2012/0190380 | A1 | 7/2012 | Dupray et al. | |

FOREIGN PATENT DOCUMENTS

| | | | |
|---|---|---|---|
| GB | 2 448 482 | A | 10/2008 |
| NZ | 541176 | A | 8/2005 |
| WO | WO 03/098175 | | 11/2003 |
| WO | WO 2007/121508 | | 11/2007 |
| WO | WO 2010/077688 | | 7/2010 |
| WO | WO 2011/008871 | | 1/2011 |
| WO | WO 2011/008884 | | 1/2011 |
| WO | WO 2011/014708 | | 2/2011 |
| WO | WO 2011/022412 | | 2/2011 |
| WO | WO 2011/025821 | | 3/2011 |
| WO | WO 2011/025829 | | 3/2011 |
| WO | WO 2011/025987 | | 3/2011 |

OTHER PUBLICATIONS

U.S. Appl. No. 13/569,884, filed Aug. 8, 2012, Cova et al.

International Search Report and Written Opinion of the International Searching Authority, PCT Application Serial No. PCT/US2009/067210, received Feb. 4, 2010, 9 pp.

International Preliminary Report on Patentability, PCT Application Serial No. PCT/US2009/067210, received Jun. 23, 2011, 8 pp.

International Search Report and Written Opinion of the International Searching Authority, PCT Application Serial No. PCT/US2010/041994, filed Jul. 14, 2010, received Sep. 14, 2010, 12 pp.

International Preliminary Report on Patentability, PCT Application Serial No. PCT/US2010/041994, filed Jul. 14, 2010, received Jan. 17, 2012, 11 pp.

International Search Report and Written Opinion of the International Searching Authority, PCT Application Serial No. PCT/US2010/047042, filed Aug. 27, 2010, received Dec. 27, 2010, 11 pp.

International Preliminary Report on Patentability, PCT Application Serial No. PCT/US2010/047042, filed Aug. 27, 2010, received Feb. 28, 2012, 8 pp.

International Search Report and Written Opinion of the International Searching Authority, PCT Application Serial No. PCT/US2010/043795, filed Jul. 29, 2010, received Sep. 17, 2010, 11 pp.

International Preliminary Report on Patentability, PCT Application Serial No. PCT/US2010/043795, filed Jul. 29, 2010, received Jan. 31, 2012, 9 pp.

International Search Report and Written Opinion of the International Searching Authority, PCT Application Serial No. PCT/US2010/045776, filed Aug. 17, 2010, received Oct. 8, 2010, 14 pp.

International Preliminary Report on Patentability, PCT Application Serial No. PCT/US2010/045776, filed Aug. 17, 2010, received Feb. 21, 2012, 9 pp.

International Search Report and Written Opinion of the International Searching Authority, PCT Application Serial No. PCT/US2010/042014, filed Jul. 14, 2010, Received Sep. 14, 2010, 8 pp.

InternationaPreliminary Report on Patentability, PCT Application Serial No. PCT/US2010/042014, filed Jul. 14, 2010, Received Jan. 17, 2012, 7 pp.

International Search Report and Written Opinion of the International Searching Authority, PCT Application Serial No. PCT/US2010/046655, mailed Oct. 20, 2010, 9 pp.

International Preliminary Report on Patentability, PCT Application Serial No. PCT/US2010/046655, mailed Mar. 8, 2012, 8 pp.

International Search Report and Written Opinion of the International Searching Authority, PCT Application Serial No. PCT/US2010/046640, filed Aug. 25 2010, mailed Oct. 18, 2010, 9 pp.

International Preliminary Report on Patentability, PCT Application Serial No. PCT/US2010/046640, filed Aug. 25 2010, mailed Mar. 6, 2012, 8 pp.

"Hercules "Zigbee" e-Seal Bolt". Bolt eSeal Electronic Seals—TydenBrooks. Retrieved from the internet: URL<URL: http://www.tydenbrooks.com/Products/Electronic-Seals/Bolt-eSeal.aspx>, Aug. 2, 2012. 2 pages.

Bajikar, Sundeep. "Trusted Platform Module (TPM) based Security on Notebook PCs—White Paper", Jun. 20, 2002, Mobile Platforms Group, Intel Corporation. Retrieved from the internet: URL<http://www.intel. com/design/mobile/platform/downloads/Trusted_Platform_Module_White_Paper.pdf>, Aug. 2, 2012. 20 pages.

Chin, Le-Pong, et al. "The Role of Electronic Container Seal (E-Seal) with RFID Technology in the Container Security Initiatives." Proceedings of the International Conference on MEMS, NANO and Smart Systems 2004. ICMENS. Aug. 25-27, 2004. Pages 116-120.

FAQ, Trusted Computing group—Developers. Retrieved from the Internet: URL<http://www.trustedcomputinggroup.org/faq/TPMFAQ/>, Oct. 19, 2010. 2 pages.

Liaw, M. And Cova, N., "Data Quality Delivered," A Savi Networks White Paper, copyright 2006, 19 pages.

Maersk Line, "Maersk Line Shipping Containers Worldwide". Retrieved from internet: URL<http://www.maerskline.com/link/?page=brochure&path=/our_services/our_e-commerce_services/maerskline.com/the_shipping_process/tracking>, dated Aug. 19, 2009. 7 pages.

Reid Simmons et al., "Learning to Predict Driver Route and Destination Intent" , Sep. 17-20, 2006, Proceedings of the 2006 IEEE Intelligent Transportation System Conference, pp. 127-132.

Siror, Joseph, et al. "Impact of RFID Technology on Tracking of Export Goods in Kenya." From Journal of Convergence Information Technology, vol. 5, No. 9. Nov. 2010. pp. 190-200.

GlobalTrak, "GlobalTrak+Asset Monitoring Unit." GlobalTrak Product Brochure/Datasheet. Published Pre-Oct. 1, 2009. 2 pages.

* cited by examiner

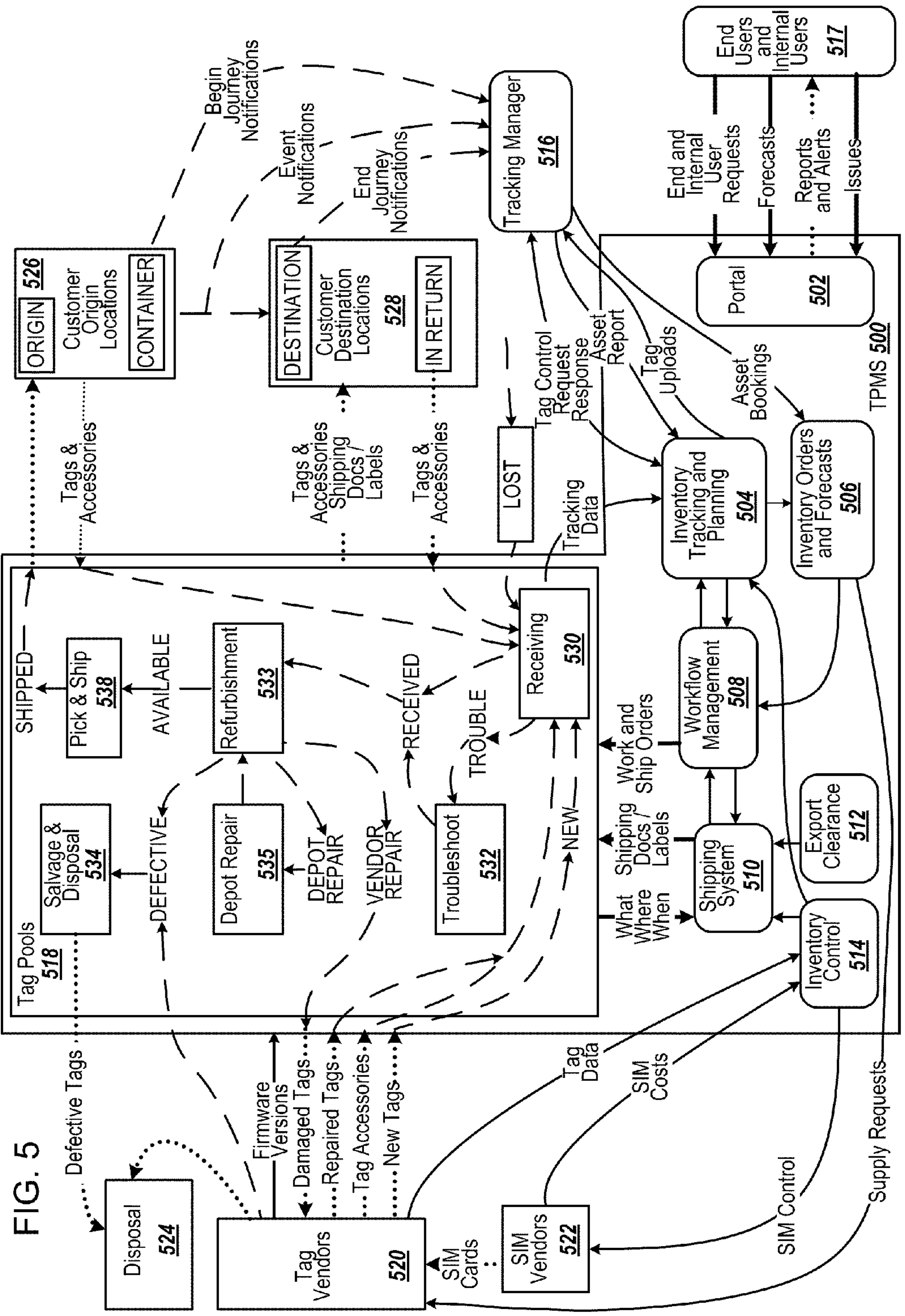
FIG. 5
ORIGIN
Customer Origin Locations
526
CONTAINER
DESTINATION
Customer Destination Locations
528
IN RETURN
Begin Journey Notifications
Event Notifications
End Journey Notifications
Tracking Manager
516
End Users and Internal Users
517
End and Internal User Requests
Forecasts
Reports and Alerts
Issues
Portal
502
TPMS 500
Tag Control Request Response
Asset Report
Tag Uploads
Asset Bookings
LOST
Tracking Data
Inventory Tracking and Planning
504
Inventory Orders and Forecasts
506
Workflow Management
508
Shipping System
510
Export Clearance
512
Inventory Control
514
Work and Ship Orders
Shipping Docs / Labels
What Where When
Tags & Accessories
Tags & Accessories Shipping Docs / Labels
Tags & Accessories
Tag Pools
518
SHIPPED
Pick & Ship
538
AVAILABLE
Refurbishment
533
RECEIVED
Receiving
530
TROUBLE
Salvage & Disposal
534
DEFECTIVE
Depot Repair
535
DEPOT REPAIR
VENDOR REPAIR
Troubleshoot
532
NEW
Defective Tags
Disposal
524
Firmware Versions
Damaged Tags
Repaired Tags
Tag Accessories
New Tags
Tag Vendors
520
SIM Cards
SIM Vendors
522
Tag Data
SIM Costs
SIM Control
Supply Requests Web Part Page – Web Browser File Edit View Favorites Tools Help Back ▾

Figure 10A:
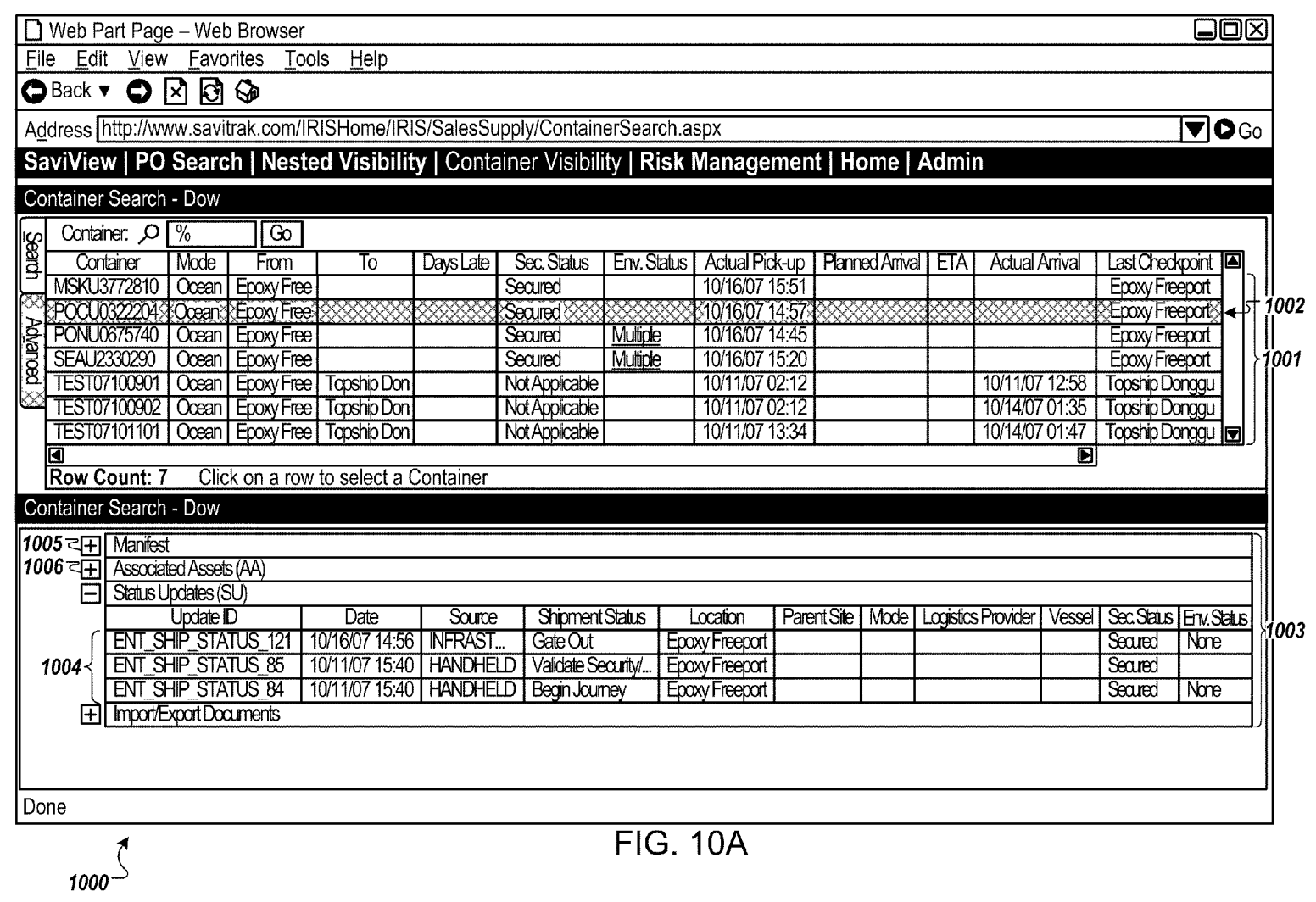

Address http://www.savitrak.com/IRISHome/IRIS/SalesSupply/ContainerSearch.aspx Go

SaviView | PO Search | Nested Visibility | Container Visibility | Risk Management | Home | Admin

Container Search - Dow

Search | Advanced

Container: % Go

| Container | Mode | From | To | Days Late | Sec. Status | Env. Status | Actual Pick-up | Planned Arrival | ETA | Actual Arrival | Last Checkpoint |
|---|---|---|---|---|---|---|---|---|---|---|---|
| MSKU3772810 | Ocean | Epoxy Free | | | Secured | | 10/16/07 15:51 | | | | Epoxy Freeport |
| POCU0322204 | Ocean | Epoxy Free | | | Secured | | 10/16/07 14:57 | | | | Epoxy Freeport |
| PONU0675740 | Ocean | Epoxy Free | | | Secured | Multiple | 10/16/07 14:45 | | | | Epoxy Freeport |
| SEAU2330290 | Ocean | Epoxy Free | | | Secured | Multiple | 10/16/07 15:20 | | | | Epoxy Freeport |
| TEST07100901 | Ocean | Epoxy Free | Topship Don | | Not Applicable | | 10/11/07 02:12 | | | 10/11/07 12:58 | Topship Donggu |
| TEST07100902 | Ocean | Epoxy Free | Topship Don | | Not Applicable | | 10/11/07 02:12 | | | 10/14/07 01:35 | Topship Donggu |
| TEST07101101 | Ocean | Epoxy Free | Topship Don | | Not Applicable | | 10/11/07 13:34 | | | 10/14/07 01:47 | Topship Donggu |

Row Count: 7 Click on a row to select a Container

1002

1001

Container Search - Dow

1005 ⊞ Manifest

1006 ⊞ Associated Assets (AA)

⊟ Status Updates (SU)

| Update ID | Date | Source | Shipment Status | Location | Parent Site | Mode | Logistics Provider | Vessel | Sec. Status | Env. Status |
|---|---|---|---|---|---|---|---|---|---|---|
| ENT_SHIP_STATUS_121 | 10/16/07 14:56 | INFRAST... | Gate Out | Epoxy Freeport | | | | | Secured | None |
| ENT_SHIP_STATUS_85 | 10/11/07 15:40 | HANDHELD | Validate Security/... | Epoxy Freeport | | | | | Secured | |
| ENT_SHIP_STATUS_84 | 10/11/07 15:40 | HANDHELD | Begin Journey | Epoxy Freeport | | | | | Secured | None |

1004

⊞ Import/Export Documents

1003

Done

Figure 10B:
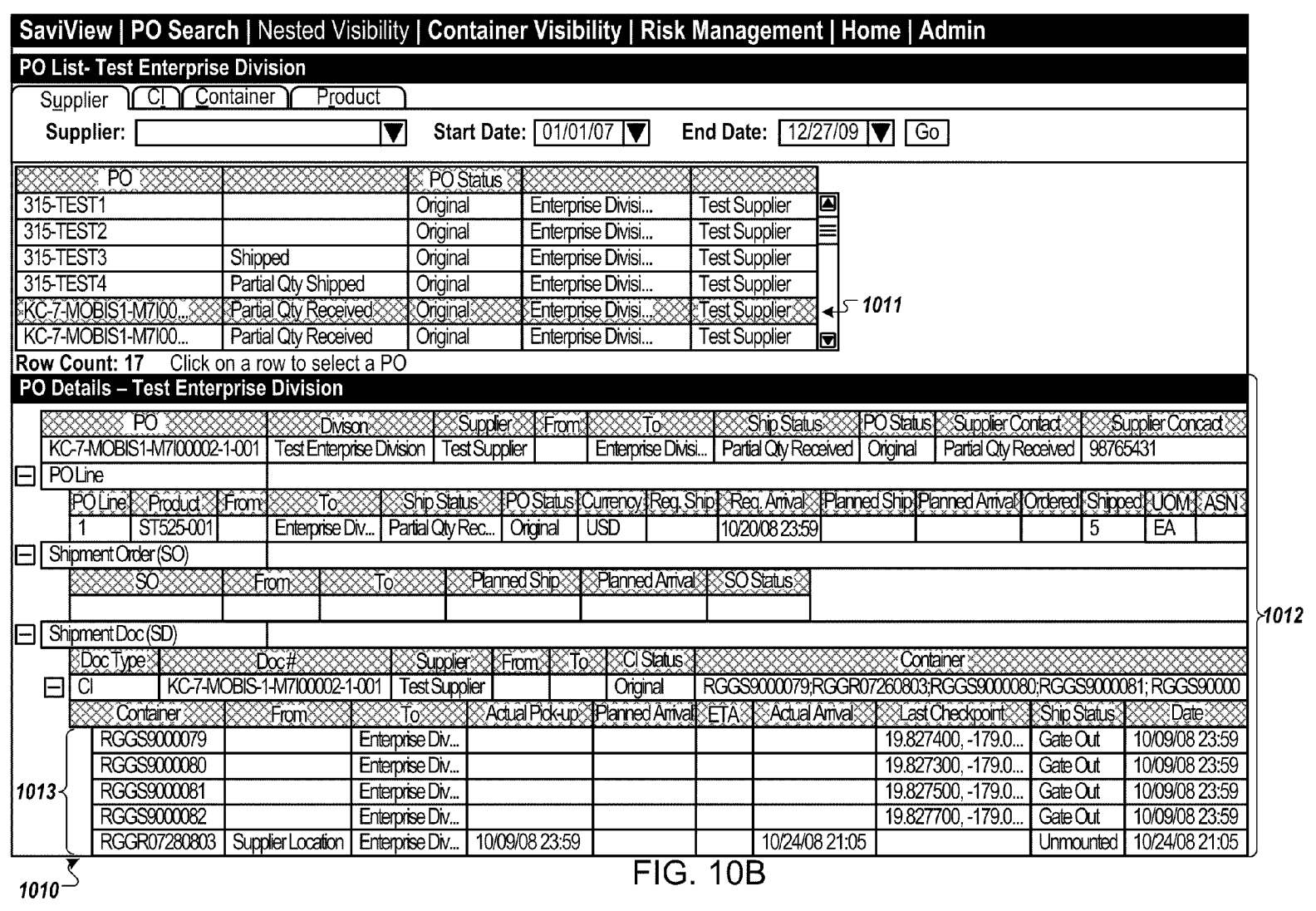

SaviView | PO Search | Nested Visibility | Container Visibility | Risk Management | Home | Admin

PO List- Test Enterprise Division

Supplier | CI | Container | Product

Supplier: [ ▼] Start Date: 01/01/07 ▼ End Date: 12/27/09 ▼ Go

| PO | | PO Status | | |
|---|---|---|---|---|
| 315-TEST1 | | Original | Enterprise Divisi... | Test Supplier |
| 315-TEST2 | | Original | Enterprise Divisi... | Test Supplier |
| 315-TEST3 | Shipped | Original | Enterprise Divisi... | Test Supplier |
| 315-TEST4 | Partial Qty Shipped | Original | Enterprise Divisi... | Test Supplier |
| KC-7-MOBIS1-M7I00... | Partial Qty Received | Original | Enterprise Divisi... | Test Supplier |
| KC-7-MOBIS1-M7I00... | Partial Qty Received | Original | Enterprise Divisi... | Test Supplier |

1011

Row Count: 17 Click on a row to select a PO

PO Details – Test Enterprise Division

| PO | Divison | Supplier | From | To | Ship Status | PO Status | Supplier Contact | Supplier Concact |
|---|---|---|---|---|---|---|---|---|
| KC-7-MOBIS1-M7I00002-1-001 | Test Enterprise Division | Test Supplier | | Enterprise Divisi... | Partial Qty Received | Original | Partial Qty Received | 98765431 |

⊟ PO Line

| PO Line | Product | From | To | Ship Status | PO Status | Currency | Req. Ship | Req. Arrival | Planned Ship | Planned Arrival | Ordered | Shipped | UOM | ASN |
|---|---|---|---|---|---|---|---|---|---|---|---|---|---|---|
| 1 | ST525-001 | | Enterprise Div... | Partial Qty Rec... | Original | USD | | 10/20/08 23:59 | | | | 5 | EA | |

⊟ Shipment Order (SO)

| SO | From | To | Planned Ship | Planned Arrival | SO Status |
|---|---|---|---|---|---|
| | | | | | |

⊟ Shipment Doc (SD)

| Doc Type | Doc # | Supplier | From | To | CI Status | Container |
|---|---|---|---|---|---|---|
| CI | KC-7-MOBIS-1-M7I00002-1-001 | Test Supplier | | | Original | RGGS9000079;RGGR07260803;RGGS9000080;RGGS9000081; RGGS90000 |

| Container | From | To | Actual Pick-up | Planned Arrival | ETA | Actual Arrival | Last Checkpoint | Ship Status | Date |
|---|---|---|---|---|---|---|---|---|---|
| RGGS9000079 | | Enterprise Div... | | | | | 19.827400, -179.0... | Gate Out | 10/09/08 23:59 |
| RGGS9000080 | | Enterprise Div... | | | | | 19.827300, -179.0... | Gate Out | 10/09/08 23:59 |
| RGGS9000081 | | Enterprise Div... | | | | | 19.827500, -179.0... | Gate Out | 10/09/08 23:59 |
| RGGS9000082 | | Enterprise Div... | | | | | 19.827700, -179.0... | Gate Out | 10/09/08 23:59 |
| RGGR07280803 | Supplier Location | Enterprise Div... | 10/09/08 23:59 | | | 10/24/08 21:05 | | Unmounted | 10/24/08 21:05 |

Figure 10D:
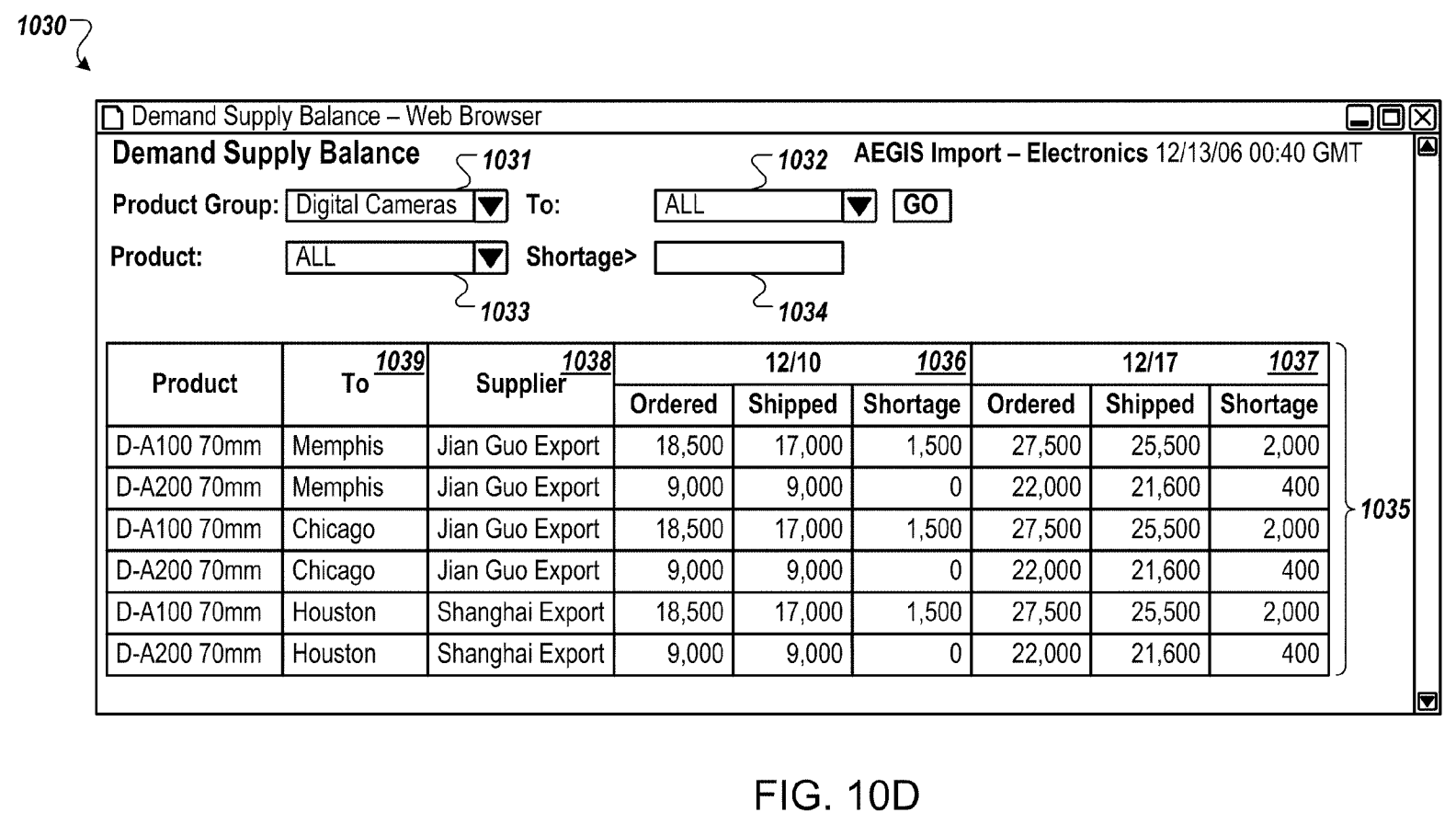

Demand Supply Balance – Web Browser

Demand Supply Balance 1031 1032 AEGIS Import – Electronics 12/13/06 00:40 GMT

Product Group: Digital Cameras To: ALL GO

Product: ALL Shortage>

1033 1034

| Product | To 1039 | Supplier 1038 | 12/10 1036 | | | 12/17 1037 | | |
|---|---|---|---|---|---|---|---|---|
| | | | Ordered | Shipped | Shortage | Ordered | Shipped | Shortage |
| D-A100 70mm | Memphis | Jian Guo Export | 18,500 | 17,000 | 1,500 | 27,500 | 25,500 | 2,000 |
| D-A200 70mm | Memphis | Jian Guo Export | 9,000 | 9,000 | 0 | 22,000 | 21,600 | 400 |
| D-A100 70mm | Chicago | Jian Guo Export | 18,500 | 17,000 | 1,500 | 27,500 | 25,500 | 2,000 |
| D-A200 70mm | Chicago | Jian Guo Export | 9,000 | 9,000 | 0 | 22,000 | 21,600 | 400 |
| D-A100 70mm | Houston | Shanghai Export | 18,500 | 17,000 | 1,500 | 27,500 | 25,500 | 2,000 |
| D-A200 70mm | Houston | Shanghai Export | 9,000 | 9,000 | 0 | 22,000 | 21,600 | 400 |

Figure 10F:
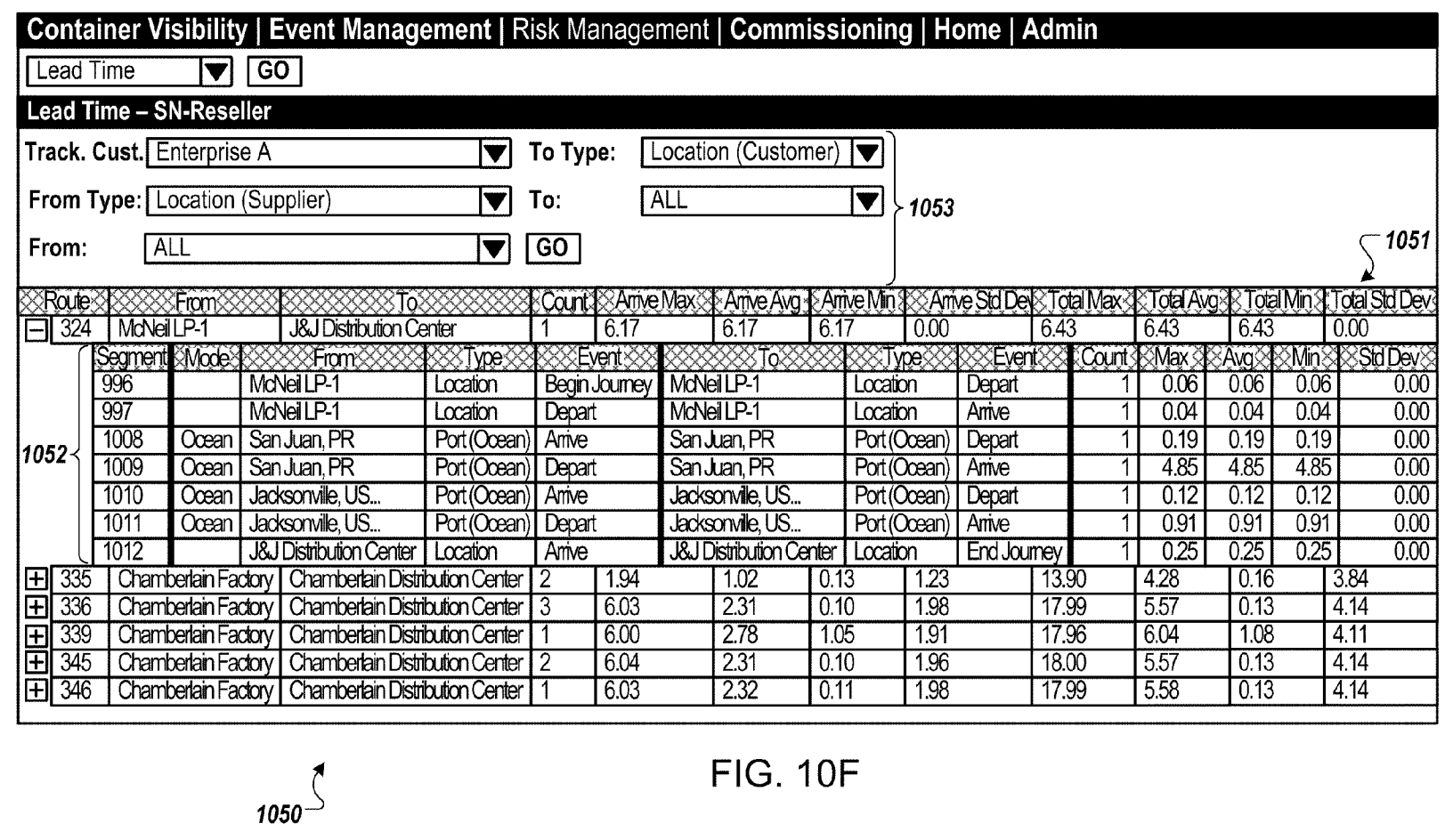

Container Visibility | Event Management | Risk Management | Commissioning | Home | Admin Lead Time ▼ GO

Lead Time – SN-Reseller

Track. Cust. Enterprise A ▼ To Type: Location (Customer) ▼

From Type: Location (Supplier) ▼ To: ALL ▼ 1053

From: ALL ▼ GO

1051

| Route | From | To | Count | Arrive Max | Arrive Avg | Arrive Min | Arrive Std Dev | Total Max | Total Avg | Total Min | Total Std Dev |
|---|---|---|---|---|---|---|---|---|---|---|---|
| ⊟ 324 | McNeil LP-1 | J&J Distribution Center | 1 | 6.17 | 6.17 | 6.17 | 0.00 | 6.43 | 6.43 | 6.43 | 0.00 |

1052

| Segment | Mode | From | Type | Event | To | Type | Event | Count | Max | Avg | Min | Std Dev |
|---|---|---|---|---|---|---|---|---|---|---|---|---|
| 996 | | McNeil LP-1 | Location | Begin Journey | McNeil LP-1 | Location | Depart | 1 | 0.06 | 0.06 | 0.06 | 0.00 |
| 997 | | McNeil LP-1 | Location | Depart | McNeil LP-1 | Location | Arrive | 1 | 0.04 | 0.04 | 0.04 | 0.00 |
| 1008 | Ocean | San Juan, PR | Port (Ocean) | Arrive | San Juan, PR | Port (Ocean) | Depart | 1 | 0.19 | 0.19 | 0.19 | 0.00 |
| 1009 | Ocean | San Juan, PR | Port (Ocean) | Depart | San Juan, PR | Port (Ocean) | Arrive | 1 | 4.85 | 4.85 | 4.85 | 0.00 |
| 1010 | Ocean | Jacksonville, US... | Port (Ocean) | Arrive | Jacksonville, US... | Port (Ocean) | Depart | 1 | 0.12 | 0.12 | 0.12 | 0.00 |
| 1011 | Ocean | Jacksonville, US... | Port (Ocean) | Depart | Jacksonville, US... | Port (Ocean) | Arrive | 1 | 0.91 | 0.91 | 0.91 | 0.00 |
| 1012 | | J&J Distribution Center | Location | Arrive | J&J Distribution Center | Location | End Journey | 1 | 0.25 | 0.25 | 0.25 | 0.00 |

| Route | From | To | Count | Arrive Max | Arrive Avg | Arrive Min | Arrive Std Dev | Total Max | Total Avg | Total Min | Total Std Dev |
|---|---|---|---|---|---|---|---|---|---|---|---|
| ⊞ 335 | Chamberlain Factory | Chamberlain Distribution Center | 2 | 1.94 | 1.02 | 0.13 | 1.23 | 13.90 | 4.28 | 0.16 | 3.84 |
| ⊞ 336 | Chamberlain Factory | Chamberlain Distribution Center | 3 | 6.03 | 2.31 | 0.10 | 1.98 | 17.99 | 5.57 | 0.13 | 4.14 |
| ⊞ 339 | Chamberlain Factory | Chamberlain Distribution Center | 1 | 6.00 | 2.78 | 1.05 | 1.91 | 17.96 | 6.04 | 1.08 | 4.11 |
| ⊞ 345 | Chamberlain Factory | Chamberlain Distribution Center | 2 | 6.04 | 2.31 | 0.10 | 1.96 | 18.00 | 5.57 | 0.13 | 4.14 |
| ⊞ 346 | Chamberlain Factory | Chamberlain Distribution Center | 1 | 6.03 | 2.32 | 0.11 | 1.98 | 17.99 | 5.58 | 0.13 | 4.14 |

Figure 10G:
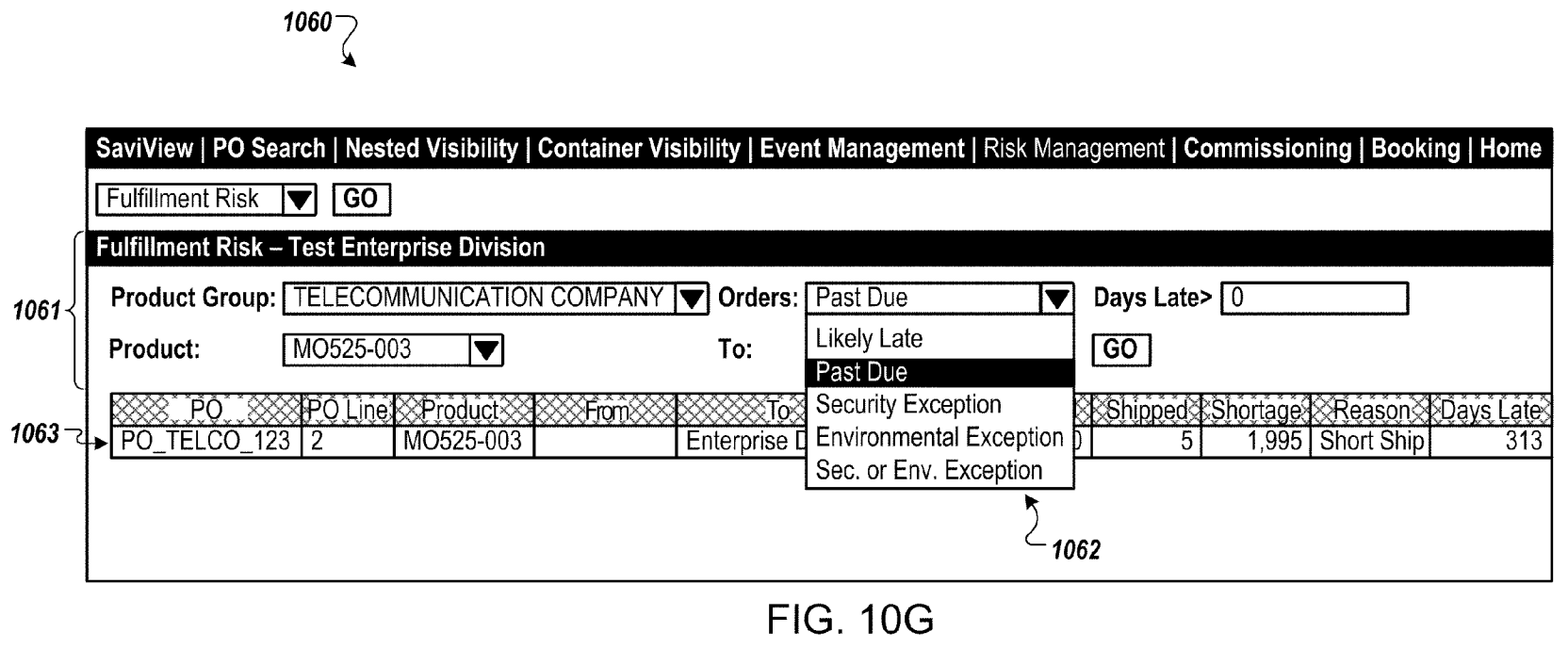

SaviView | PO Search | Nested Visibility | Container Visibility | Event Management | Risk Management | Commissioning | Booking | Home Fulfillment Risk GO Fulfillment Risk – Test Enterprise Division Product Group: TELECOMMUNICATION COMPANY Orders: Past Due Days Late> 0

Product: MO525-003 To: GO

Likely Late
Past Due
Security Exception
Environmental Exception
Sec. or Env. Exception

| PO | PO Line | Product | From | To | Shipped | Shortage | Reason | Days Late |
|---|---|---|---|---|---|---|---|---|
| PO_TELCO_123 | 2 | MO525-003 | | Enterprise D | 5 | 1,995 | Short Ship | 313 |

Figure 10H:
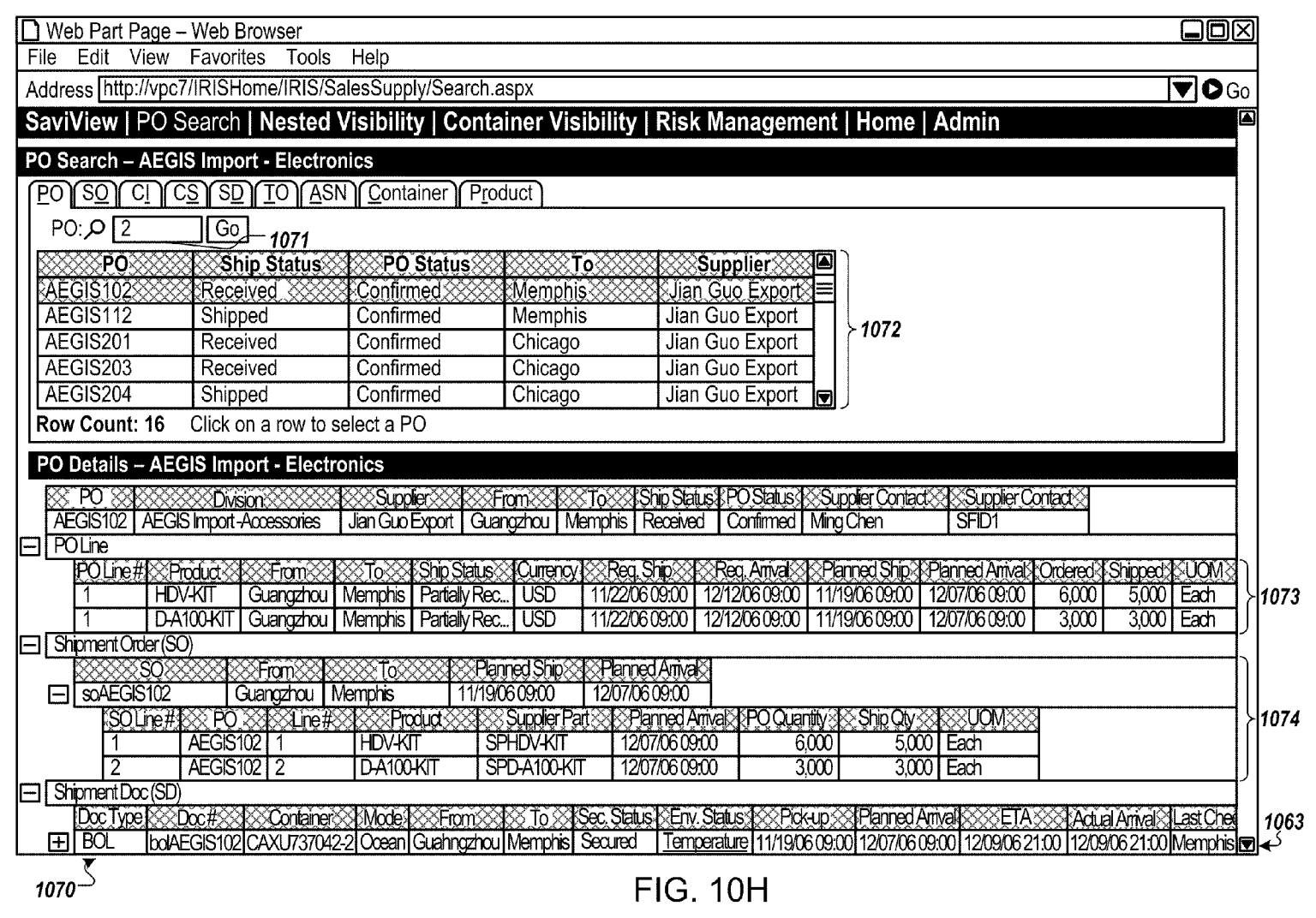

Web Part Page – Web Browser

File Edit View Favorites Tools Help

Address http://vpc7/IRISHome/IRIS/SalesSupply/Search.aspx Go

SaviView | PO Search | Nested Visibility | Container Visibility | Risk Management | Home | Admin PO Search – AEGIS Import - Electronics PO SO CI CS SD TO ASN Container Product PO: 2 Go 1071

| PO | Ship Status | PO Status | To | Supplier |
|---|---|---|---|---|
| AEGIS102 | Received | Confirmed | Memphis | Jian Guo Export |
| AEGIS112 | Shipped | Confirmed | Memphis | Jian Guo Export |
| AEGIS201 | Received | Confirmed | Chicago | Jian Guo Export |
| AEGIS203 | Received | Confirmed | Chicago | Jian Guo Export |
| AEGIS204 | Shipped | Confirmed | Chicago | Jian Guo Export |

1072

Row Count: 16 Click on a row to select a PO

PO Details – AEGIS Import - Electronics

| PO | Division | Supplier | From | To | Ship Status | PO Status | Supplier Contact | Supplier Contact |
|---|---|---|---|---|---|---|---|---|
| AEGIS102 | AEGIS Import -Accessories | Jian Guo Export | Guangzhou | Memphis | Received | Confirmed | Ming Chen | SFID1 |

PO Line

| PO Line # | Product | From | To | Ship Status | Currency | Req. Ship | Req. Arrival | Planned Ship | Planned Arrival | Ordered | Shipped | UOM |
|---|---|---|---|---|---|---|---|---|---|---|---|---|
| 1 | HDV-KIT | Guangzhou | Memphis | Partially Rec... | USD | 11/22/06 09:00 | 12/12/06 09:00 | 11/19/06 09:00 | 12/07/06 09:00 | 6,000 | 5,000 | Each |
| 1 | D-A100-KIT | Guangzhou | Memphis | Partially Rec... | USD | 11/22/06 09:00 | 12/12/06 09:00 | 11/19/06 09:00 | 12/07/06 09:00 | 3,000 | 3,000 | Each |

1073

Shipment Order (SO)

| SO | From | To | Planned Ship | Planned Arrival |
|---|---|---|---|---|
| soAEGIS102 | Guangzhou | Memphis | 11/19/06 09:00 | 12/07/06 09:00 |

| SO Line # | PO | Line # | Product | Supplier Part | Planned Arrival | PO Quantity | Ship Qty | UOM |
|---|---|---|---|---|---|---|---|---|
| 1 | AEGIS102 | 1 | HDV-KIT | SPHDV-KIT | 12/07/06 09:00 | 6,000 | 5,000 | Each |
| 2 | AEGIS102 | 2 | D-A100-KIT | SPD-A100-KIT | 12/07/06 09:00 | 3,000 | 3,000 | Each |

1074

Shipment Doc (SD)

| Doc Type | Doc # | Container | Mode | From | To | Sec. Status | Env. Status | Pick-up | Planned Arrival | ETA | Actual Arrival | Last Che |
|---|---|---|---|---|---|---|---|---|---|---|---|---|
| BOL | bolAEGIS102 | CAXU737042-2 | Ocean | Guahngzhou | Memphis | Secured | Temperature | 11/19/06 09:00 | 12/07/06 09:00 | 12/09/06 21:00 | 12/09/06 21:00 | Memphis |

ASSET MONITORING AND TRACKING SYSTEM

CROSS-REFERENCE TO RELATED APPLICATIONS

This application claims the benefit under 35 U.S.C. §119 (e) of U.S. Patent Application No. 61/237,936, titled "Asset Monitoring and Tracking System," filed Aug. 28, 2009, which is incorporated here by reference.

TECHNICAL FIELD

This subject matter is related generally to monitoring and tracking physical assets such as intermodal shipping containers.

BACKGROUND

Users often want to track their cargo as it journeys from one location to another. Users generally purchase and install dedicated hardware and software to perform this tracking. However, there are several problems with this approach.

First, purchasing and maintaining dedicated hardware and software can be costly for users. In addition to purchasing the hardware and software, users also have to contract with communication services and hosting services to receive information from the dedicated hardware devices. This can include, for example, negotiating and maintaining roaming partner lists, billing rates, and service packages. Once a tracking system is in place, users typically have to maintain the hardware and software. For example, users are generally responsible for tracking SIM cards, performing hardware and software upgrades, optimizing the hardware and software for international performance, detecting obsolescence, and performing routine maintenance and health checks of the hardware and software. In addition, the user must manage forward logistics and reverse logistics and control for the risk of devices failing.

Second, the dedicated hardware and software purchased by users typically tracks conveyances (e.g., trucks, ships, trains, etc.) used to transport cargo, rather than individual pieces of cargo itself. The dedicated hardware also often requires power from the conveyances themselves.

Finally, users who use this dedicated hardware are generally presented with raw tracking data, without details of the surrounding context of the shipment. This can limit the usefulness of the tracking data, as integrating the various sources of data is expensive.

SUMMARY

Techniques for tracking physical assets such as intermodal shipping containers, and providing intelligent services to an end user based on locations of the assets, are disclosed. In one aspect, input requesting tracking of an asset is received, a tag is selected to associate with the asset in accordance with the input. Event notifications are received for the tag while the tag is in transit, and user notifications are generated from the event notifications and enterprise data. In some implementations, the event notifications and enterprise data are used to generate one or more supply chain management statistics.

Particular embodiments of the subject matter described in this specification can be implemented to realize one or more of the following advantages. Individual assets can be tracked in real-time. End user overhead can be reduced. Asset tracking data can be made more relevant to end users by tying its meaning to the details of the end users' businesses. Practical, timely statistics can be generated to allow end users to identify, and solve, potential problems. For example, useful statistics such as actual lead-times, fulfillment risk, dynamic estimated time of arrival, inventory status, demand and supply balance, and carrier and vendor scorecards can be calculated. These statistics can be used to improve supply chain performance and help end users make decisions about their supply chain, such as which ports and which carriers to use. A single point of access to inventory, shipment, and other information, across all points in the physical supply chain and throughout the entire purchase order to fulfillment lifecycle can be provided. Real-time risk management solutions can be provided to end users.

BRIEF DESCRIPTION OF THE DRAWINGS

FIG. 5 illustrates an example tag pool management system.

FIGS. 10A-10H illustrate various examples of user interfaces for providing data generated by the information service module to the user.

DETAILED DESCRIPTION

Overview of Asset Tracking

Figure 1:
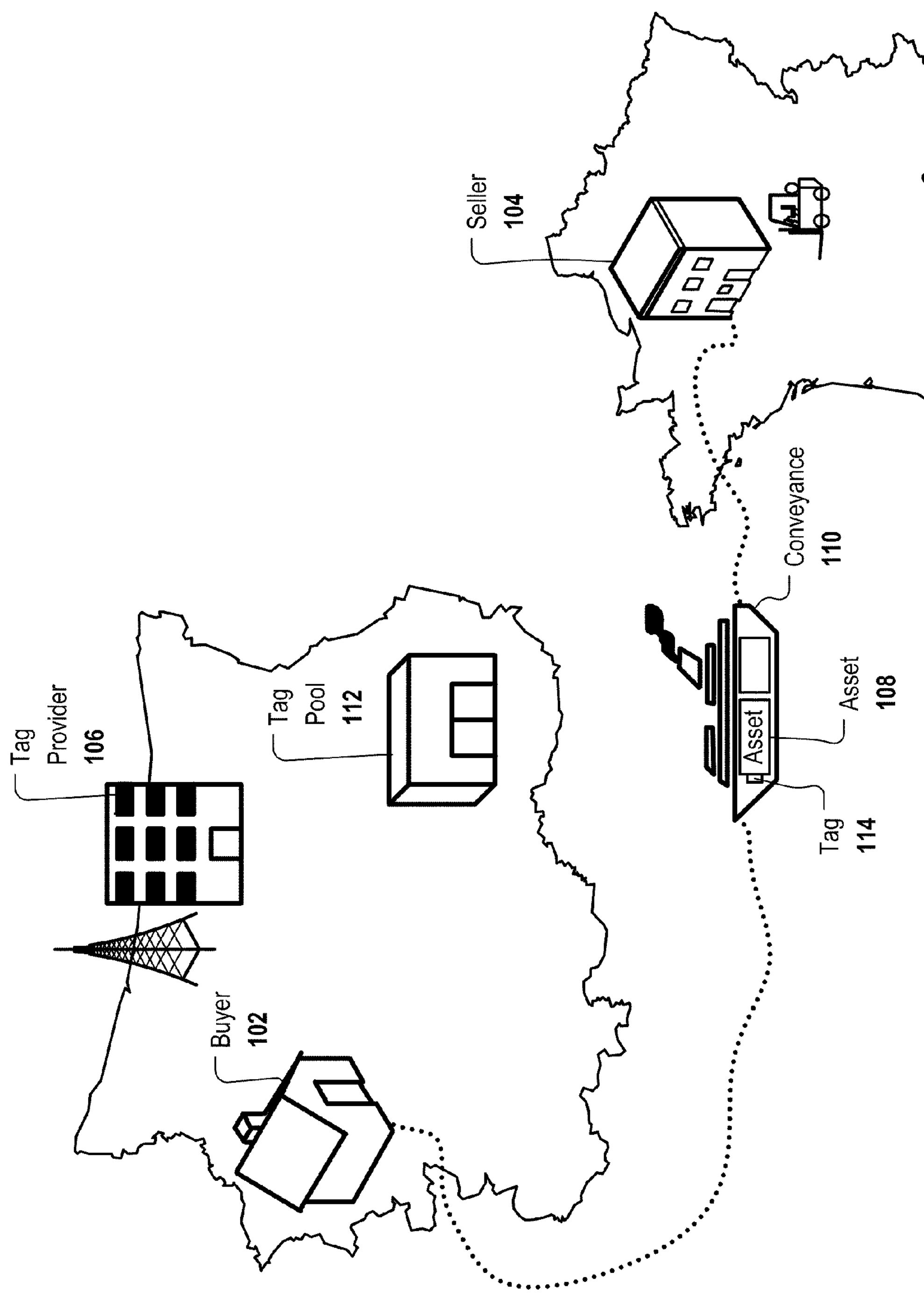
FIG. 1 illustrates an example buyer, seller, and tag provider interacting in a shipping scenario.

FIG. 1 illustrates an example buyer 102, seller 104, and tag provider 106 interacting in a shipping scenario. An example asset 108 is shipped from the seller 104 to the buyer 102 on an example conveyance 110. In some implementations, the asset is an intermodal shipping container, however the asset can also be, for example, equipment, or other items capable of being monitored or tracked. Examples of conveyances include, but are not limited to, trucks, trains, ships, and airplanes. Examples of assets include, but are not limited to, containers such as dry-van containers, refrigerated containers, ISO tanks, trailers, box trucks, and unit load devices (ULDs).

In general, either the buyer 102 or the seller 104 sends a request to the tag provider 106 requesting tracking of the shipment of the asset 108. The tag provider 106 arranges for a selected tag 114 to be sent from tag pool 112 to the location from where the asset is being shipped (e.g., a warehouse of the seller 104). The tag pool 112 is a collection of available tags. Each tag in the tag pool 112 is a tracking device that can be used to track an asset. At the location where the tag is shipped (the "origin location") the tag 114 can be affixed or coupled to the asset 108, thus securely sealing the asset 108. An example tag is the Savi Networks SN-LSE-01, which is a GPS-based Location+Security+Environmental tag. The tags do not have to use GPS, but can alternatively or additionally receive location information using various location technologies including, but not limited to: wireless networks, triangulation from cellular towers, or WiFi networks (e.g., Skyhook Wireless™ technology).

The selected tag 114 can be coupled to the asset 108 before the asset begins its journey and/or re-coupled to the asset 108 during the journey (e.g., after authorized custom inspections). During the journey, the tag 114 can be programmed to wake up periodically, initiate communication with the tag provider 106, and send event notifications to the tag provider 106. In general, each event notification can include an identification of the event (or event type), a location of the asset 108 when the event occurred, and additional details of the event such as a date and/or time when the event occurred, the status of the asset 108 before, during, or after the event, or details on the movement of the asset (e.g., accelerometer or velocimeter readings from the tag coupled to the asset). The event information can be stored by the tag provider 106, for example, in an event database. The tag 114 reports various events, including for example, security events, environmental events, process events, and tracking events. Security events can indicate that the asset 108 or tag 114 may have been tampered with. For example, the tag 114 can report when a vertical or horizontal bolt securing the tag to a container is cut (indicating that the asset was opened). Other types of tampers can also be detected (e.g., shock intrusion or light inside the asset that exceeds a threshold). Environmental events can indicate that one or more environmental variables (e.g., temperature, humidity, shock, acceleration) are beyond an acceptable range (e.g., a range specified by the user). Process events indicate that various procedural events in the journey of the asset have occurred. For example, process events can indicate that a tag 114 has been attached to the asset 108 or detached from the asset 108 (e.g., that the asset 108 is beginning or ending its tagged journey). Process events can also indicate other shipment events in the journey of the asset 108 (e.g., procedural events in the journey of the asset 108), including, but not limited to, that the asset 108 has been stuffed (e.g., filled with contents), that the asset 108 has been sealed, that the asset 108 has been flagged for customs inspection, that customs inspection of the asset 108 has begun, that customs inspection of the asset 108 has ended, that the asset 108 is in a shipping yard, that the asset 108 has left a shipping yard, that the asset 108 has sailed, that the asset 108 has been berthed, and that the asset 108 has been unsealed. Tracking events are periodic reports of the tag 114's location. For example, the tag 114 can send a report of its current location according to a schedule, for example, at fixed intervals of time, regardless of whether any other events have been issued. A tracking system (e.g., system 200 of FIG. 2) can process the tracking events to determine when an asset has entered or left a predefined area. For example, the system 200 can define geofences (e.g., a virtual perimeter) around important locations along the journey of the asset 108 (e.g., ports) and the tag 114 or the system 200 can determine that the asset has entered or left a given location when the tag 114 enters or leaves a geofence.

In some implementations, the tag provider 106 processes the various event notifications received from the tag 114 and provides notifications to the buyer 102 and/or the seller 104 and/or other parties. The notifications can be based, in part, on additional information received from the buyer 102 and/or the seller 104, for example, a description of the business of the buyer 102 and/or seller 104, a description of the contents of the asset 108, or a description of a transaction relevant to the contents of the asset 108.

In some implementations, the tag also processes commands (e.g., Over-the-Air (OTA) commands) received from the tag provider 106 during a communication session between the tag and servers operated by the tag provider 106.

Example Tag System

Figure 2:
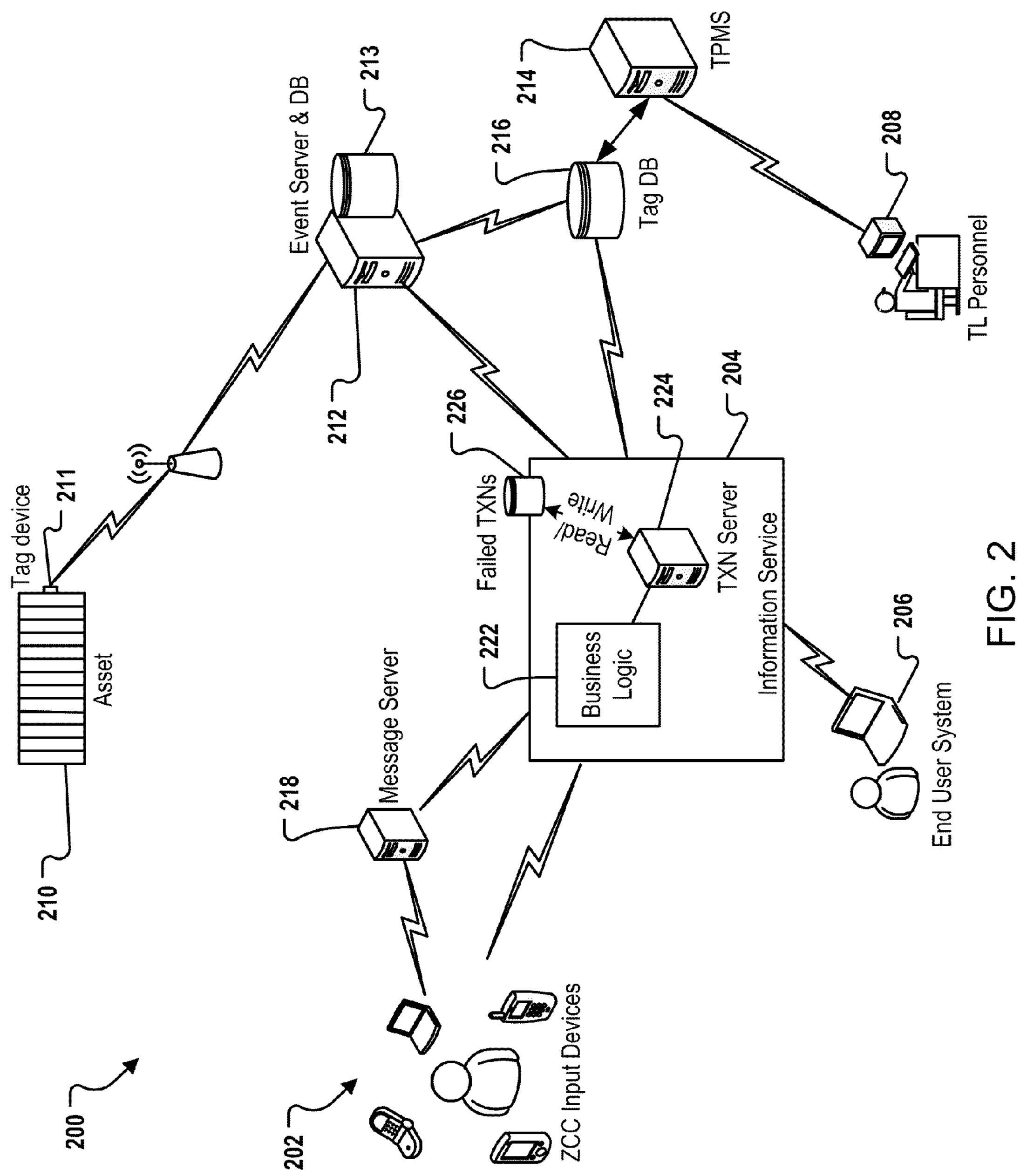
FIG. 2 is a block diagram of an example tag system that associates a tag with an asset and monitors and tracks the asset using data received from the tag.

FIG. 2 is a block diagram of an example tag system 200 that associates a tag with an asset and monitors and tracks the asset using data received from the tag. The system 200 commissions (associates) tags to assets, decommissions (disassociates) tags from assets, provides notifications of events (e.g., security, environmental, process, and tracking events), and can reset tag status remotely.

In some implementations, the system 200 can include one or more Zero Client Commissioning (ZCC) input devices 202, an information service 204, one or more end user systems 206, Tag Logistics Personnel (TL Personnel) 208, one or more assets 210, one or more tags 211 affixed or coupled to the one or more assets 210, an event server 212, an event database 213, a Tag Pool Management System (TPMS) 214, a tag database 216, a message server 218, a transaction (TXN) server 224, and a failed transaction database 226.

The ZCC input devices 202 are used to commission and decommission tags to assets. The ZCC input devices 202 can be any suitable communication device, including, but not limited to, mobile phones, land phones, email devices, and portable computers. The ZCC input devices 202 communicate with the information service 204 through the message server 218 using a variety of communication modes, including but not limited to: Integrated Voice Response (IVR), Short Message Service (SMS), email, hand-held application, Web interface, and Electronic Data Interchange (EDI) or any other form of electronic message sharing. The ZCC input devices 202 can be operated by various actors having various roles in the supply chain, including but not limited to: dock workers, longshoreman, logistics service providers, freight forwarders, field agents, customs agents, and any other personnel involved in the tracking of an asset.

The information service 204 allows end user systems 206 to track the status of assets 210 in real-time, integrates enterprise data for end user systems, and performs supply chain analysis, including generating supply chain managements statistics. The transaction server 224 runs a tracking application that receives event location/status transaction messages (e.g., event notifications) or reports from the event server 212 and applies business logic 222 to the transactions for validating and maintaining associations between tag identifiers and asset identifiers. Successful transactions are posted against assets and tags. Failed transactions and reason codes are written to an exception queue in the failed transaction database 226.

The information service 204 can use a portal (not shown) to provide Web forms to end user systems 206 (e.g., a browser on a PC or mobile device). The Web forms can provide an input mechanism for a user to commission or decommission tags and can provide an output mechanism for users to receive real-time tracking and status information regarding assets and events. An example information service 204 is SaviTrak™ provided by Savi Networks, LLC (Mountain View, Calif.).

The tag 211 wakes up periodically to initiate communication with the event server 212 and to send event notifications to the event server 212. In general, each event notification includes an identification of the event (or event type), a location of the asset when the event occurred, and optionally additional details of the event such as the status of the asset before, during, or after the event. The event notification can also include an identification of the tag, or an identification of the asset to which the tag is coupled. The event information can be stored in the event database 213. The tag 211 reports various events, including for example, security events, environmental events, process events, tracking events, and location events, as described above with reference to FIG. 1.

The event server 212 periodically receives event notifications from the tag 211. The event server can process location information in the notifications. The event server 212 also constructs and sends commands (e.g., OTA commands) to the tag 211. Some notification management functions performed by the event server 212 include but are not limited to: checking incoming notifications for syntax errors and population of mandatory fields, checking the accuracy of location information in incoming notifications, sorting or sequencing notifications logically before forwarding the notifications to the information service 204, and constructing output transactions that comply with processing logic.

In some implementations, the TPMS 214 maintains an inventory of tags in the tag database 216. The TPMS 214 also maintains the association of the asset identifier (ID) and tag ID and the logical state or status of each tag, such as 'In Use,' 'Available,' 'Begin Journey', 'End Journey', etc. The TPMS 214 also maintains the allocation and availability of tags for logistics and pre-positioning purposes, and may track the health of tags stored in inventory.

In some implementations, the TPMS 214 allows TL personnel 208 to perform housekeeping functions, such as tag forecasts, ordering new tags, detecting lost tags, billing management, salvage and environmental disposal of failed tags, inventory tracking, customer help desk and financial accounting. The TPMS 214 allows TL personnel 208 to monitor the state of a tag 211 'in journey', trouble shoot causes for failure in communicating with the event server 212, and locate lost tags. The TPMS 214 provides analytic tools to monitor tag network performance (e.g., GPS/GPRS coverage/roaming area for specific trade lanes).

The tag system 200 is one example infrastructure. Other infrastructures are also possible which contain more or fewer subsystems or components than shown in FIG. 2. For example, one or more of the servers or databases shown in FIG. 2 can be combined into a single server or database. As another example, tags can be associated with assets using dedicated handheld devices.

Example Tag Tracking Architecture

Figure 3:
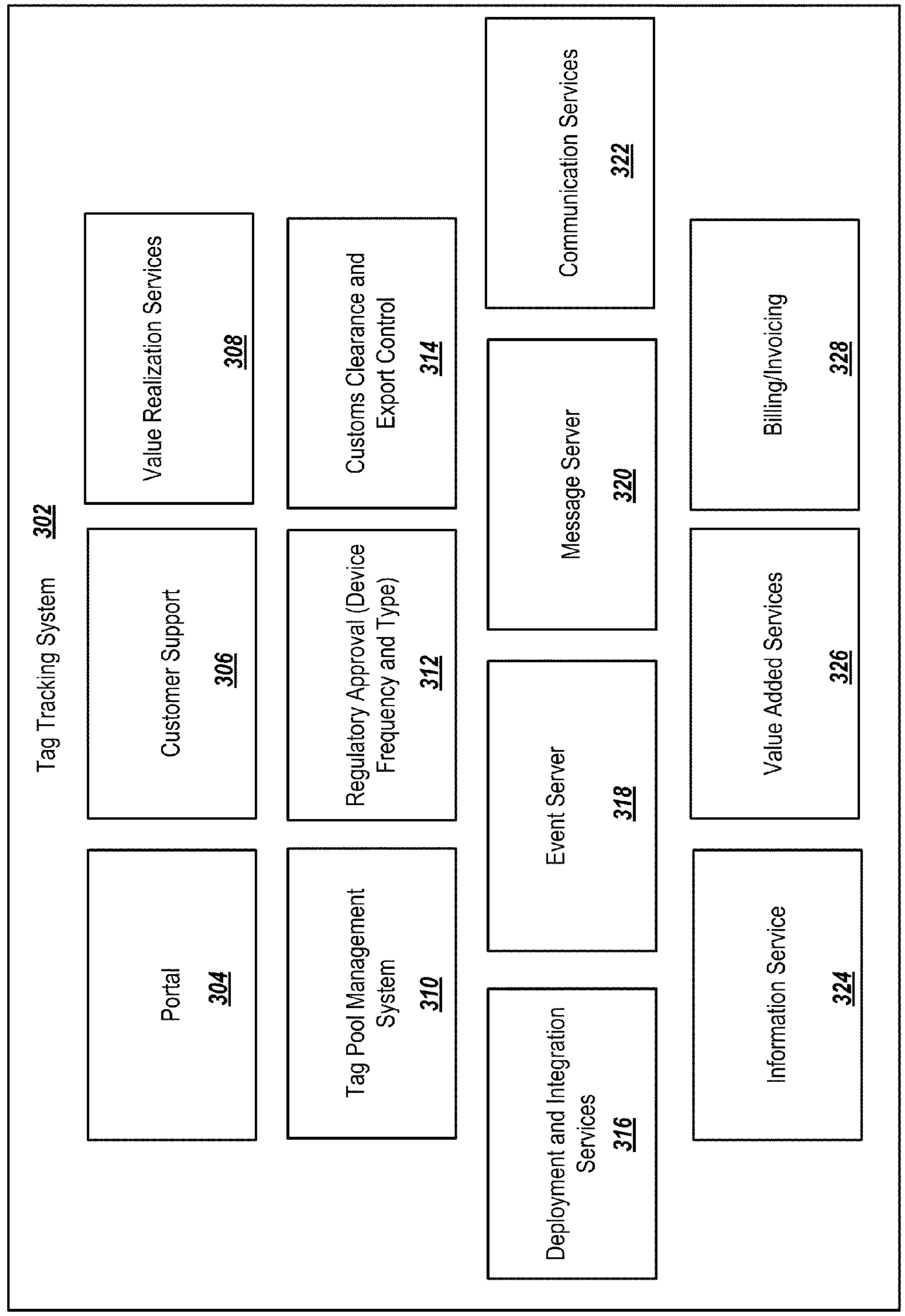
FIG. 3 illustrates an example architecture of a tag tracking system.

FIG. 3 illustrates an example architecture of a tag tracking system 302. In general, the tag tracking system 302 can include a portal module 304, a customer support module 306, a value realization services module 308, a tag pool management system 310, a regulatory approval module 312, a customs clearance and export control module 314, a deployment and integration services module 316, an event server 318, a message server 320, a communication services module 322, an information service module 324, a value added services module 326, and a billing and invoicing module 328. These components can be communicatively coupled to one or more of each other. Though the components identified above are described as being separate or distinct, two or more of the components may be combined in a single process or routine. The functional description provided herein including separation of responsibility for distinct functions is by way of example. Other groupings or other divisions of functional responsibilities can be made as necessary or in accordance with design preferences.

The portal module 304 provides a portal through which end users and internal users (e.g., tracking system employees) can send data to the system and receive data from the system. For example, the portal module 304 can be a Web portal that provides Web forms to allow users to enter information about shipment of an asset, request tracking of an asset, and provide additional information about the asset or the user's business. The portal module 304 can also generate Web pages to provide information to users, for example, to provide users with notifications received from a tag associated with an asset, or to provide users with additional information resulting from an analysis of tag notifications and other information (e.g., analysis that is part of the information service 324 and/or the value added services 326). The portal module 304 can alternatively or additionally generate interfaces outside of a Web portal, for example, e-mail notifications.

The customer support module 306 provides support to end users. For example, the customer support module 306 can include customer support agents who respond to questions from end users. The questions can be received, for example, over the phone, in e-mail, in letters, or through a website generated by the portal 304. The questions can include, for example, process related questions such as, "A tag is malfunctioning. What are the next steps?", and questions regarding operation of the tags. The customer support agents can also file bugs or enhancement requests in response to questions from end users and can provide periodic updates to end users who previously submitted bug or enhancement requests. The customer support module 306 can also help end users arrange for defective tags to be returned to the tag tracking system.

The value realization services 308 are services provided, for example, by human agents or by an automated computer system. The agents (or computer system) can analyze details of a potential end user's business in order to generate an estimate of how valuable the tracking services will be to the potential end user's business.

The tag pool management system 310 manages tag inventory, for example, as described below with reference to FIGS. 7 and 8.

The regulatory approval module 312 ensures that the tags are of an allowable type, and operate at an allowable frequency, in the countries through which the tags travel. Ensuring that tags are of an allowable type includes ensuring that the specific type of tag that is going to be used has been formally approved by regulatory bodies in the countries through which the tag will travel. Ensuring that the tags are of an allowable type may also include having the tags licensed and certified for use in the countries through which the tags will travel. Ensuring that tags operate at an allowable frequency can include receiving frequency allocations specifying a range of frequencies in which the tags can operate and ensuring that the device will have desired characteristics of peak power and few spurious emissions in the allowed frequency range. The regulatory approval model 312 can also work with telecommunications carriers to ensure that the devices are approved to connect to the carriers' communications networks. In some implementations, the regulatory approval module 312 includes agents who work with government officials in various countries, and officials at various telecommunications companies, to ensure that the tags are approved.

The customs clearance and export control module 314 is made up of one or more agents that handle the formalities involved when a tag travels through a country. The customs clearance and export control module ensures that tags are allowed into the countries through which they travel (e.g., that the tag is approved for import into and export from each country), pays any taxes (e.g., the Value Added Tax (VAT) in Europe Union countries) when the tag enters a country, and collects any refunds when the tag leaves the country. The customs clearance and export control module can also ensure that the devices are approved International Instruments of Traffic, which are treated like shipping containers rather than dutiable goods.

The deployment and integration services module 316 manages end user settings and deploys new software when necessary. For example, the deployment and integration services module 316 can create new end user accounts in the tracking system, create end user-specific locations (e.g., geofences) in the system, create new users in the tracking system, offer end user specific settings in the system, deploy periodic software update releases, provide support for incorporating hot fixes into the application, and perform other engineering tasks, as needed.

The event server 318 receives and processes event notifications from tags associated with assets, for example, as described above with reference to FIG. 2. The event server 318 can be optimized in various ways to handle large number of event notifications, for example, the server can be multi-threaded and use load-balancing algorithms to increase efficiency. The event server may further give preference to some types of event notifications (e.g., more critical notifications such as security notifications) over others.

The message server 320 receives data from various sources including RFID readers, EDI gateways, and ZCC input devices, and provides this data to the information service module. The message server can optionally use an Integrated Voice Response (IVR) server to process touch-tone information received from ZCC input devices.

The communication services 322 are the communication infrastructure that the system 302 uses across the globe to receive notifications from tags and to send commands to tags. The communication infrastructure can include, for example, cellular phone networks, satellite communications networks, radio-frequency based networks, and wireless networks). The system 302 can communicate across cellular phone networks, for example, using General Packet Radio Service (GPRS) protocols, Short Message Service (SMS) protocols, or High Speed Downlink Packet Access (HSDPA) protocols. The system 302 can connect to various satellite communication networks including, for example, Orbcomm, Iridium, and Globalstar™. Radio-frequency based networks include, for example, active RFID, passive RFID, ZigBee™, and Rubee™. In addition, data gathered using radio-frequency based techniques can be backhauled over other network systems. Wireless networks can include both WLAN and WiMax networks). The system 302 can use communication services provided by different providers. In some implementations, the tag tracking system negotiates contracts with one or more communication infrastructure providers to provide the communication services 322. The contracts can specify a fixed rate (e.g., a flat rate for all communications in a given area, or a fixed price per communication), or varying rates based, for example, on a geographic location of the asset during a communication, the time of day of the transaction, the length of the communication, the number of bits of data in the communication, etc. In some implementations, the tag tracking system includes logic to reduce costs by controlling what (if any) available communication services are used when. For example, the system may weigh the cost of alternative communication services and how important it is that a notification be sent immediately, and use these factors to select the most cost-effective communication service given the constraints. In some implementations, the system 302 maintains a list of providers that can be used for different types of events. When a tag needs to send data, the tag can go down the list of providers to determine the lowest cost means to send the data. For example, the tag can determine how much data needs to be sent, determine the available types of providers (cellular, satellite communications, etc.), and select an optimal type of provider for sending the data. The tag can then select the provider of the selected type who can send the needed amount of data at the lowest cost. In some implementations, the tag may alternatively determine that not all data needs to be sent. For example, if the tag needs to send a high priority security event notification and several lower priority tracking event notifications, but the cost of sending data is currently high, the tag may only send the security event notification, and save the tracking event notifications until it is cheaper to send the data.

The information service module 324 provides various levels of information to end users. The information service module 324 can provide a track and trace service that allows end users to view the location of their assets over time, as well as a description of any events that occurred during the asset's journey. The information service module 324 can further provide statistics generated from data describing the asset's journey as well as enterprise data describing the end user's business. The information service module 324 is described in more detail below with reference to FIGS. 7-9.

The value added services module 326 provides additional services to users. For example, the value added services can include, but are not limited to, maintaining master data for an enterprise, cleaning up master data for an end user, actively monitoring transactions, monitoring data feeds into and out of the system, and storing a backup stock of equipment for the end user. The value added services 326 can be provided by one or more agents, or alternatively by a computer system.

The billing and invoicing module 328 generates invoices and provides them to end users. The invoices specify payments owed by the end users for the tracking services rendered by the tag tracking system 302. The billing and invoicing module 328 may also track invoices to determine what invoices have been paid. The billing and invoicing module can generate invoices according to different payment plans. In some implementations, the billing and invoicing module charges end users on a per-tag basis, according to a cost-to-serve model. In these implementations, the billing and invoicing module 328 gets data indicating how many tags have been attached to assets for a given end user (e.g., from the TPMS module 310) and bills the end user accordingly. Other payment plans, for example, fixed payments that are independent of the number of tags used, are also possible.

Example Tag Journey

Figure 4:
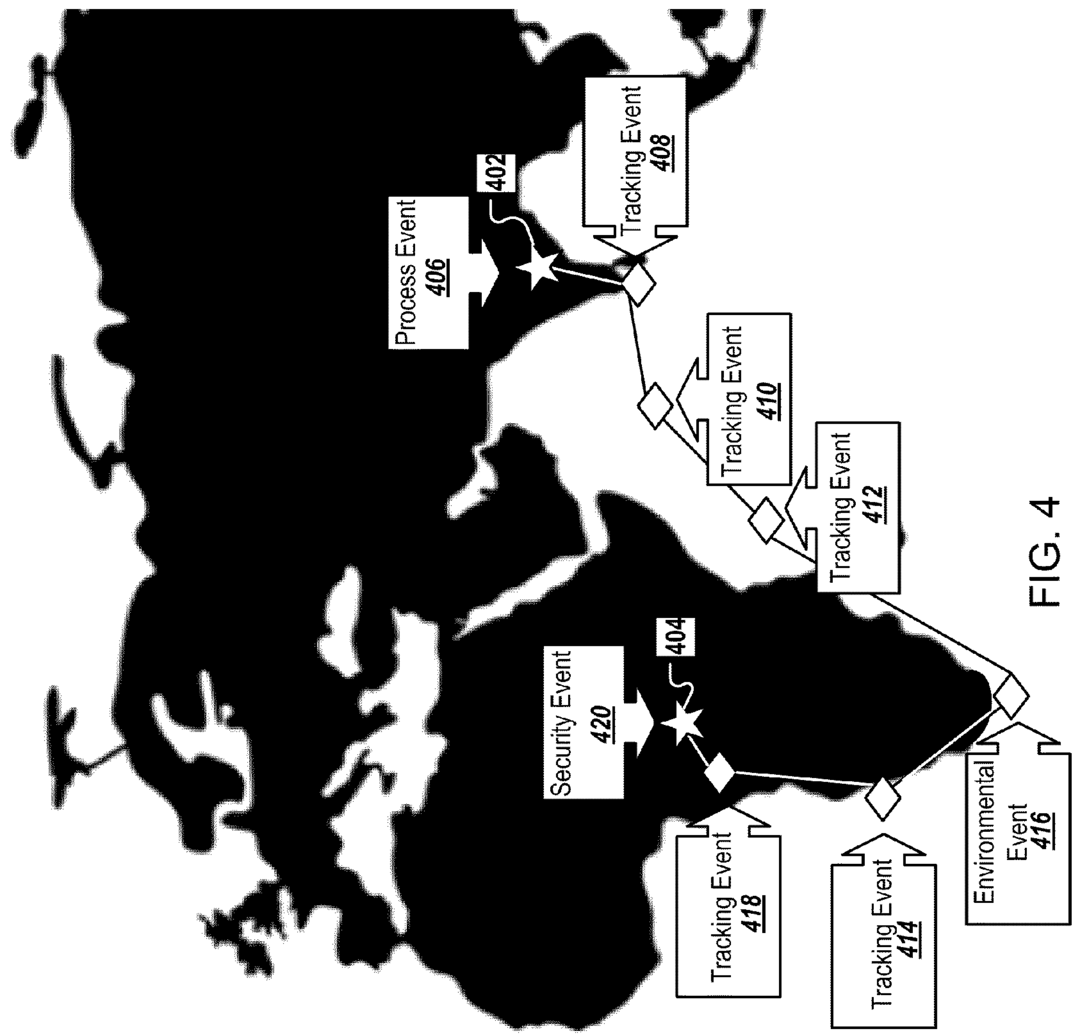
FIG. 4 illustrates an example journey of an asset from an origin location to a destination location.

FIG. 4 illustrates an example journey of an asset from a origin location 402 to a destination location 404. As the asset travels from the origin location 402 to the destination location 404, a tag associated with the asset issues various event notifications. These event notifications are received and processed by an event server (e.g., event server 318).

When the tag is first coupled to the asset, the tag generates a process event notification 406 indicating that the tag is being commissioned (e.g., associated with the asset) and that the tag and the asset are beginning their journey. Process events generally occur at known locations, such as a warehouse from which the asset is being shipped. These locations can optionally be associated with geofences that define the boundaries of the locations.

As the asset continues on its journey, the tag periodically generates tracking event notifications associated with tracking events (e.g., tracking events 408, 410, 412, 414, and 418). These event notifications provide updates on the current location of the asset, and can be used by the system to obtain useful information such as the path that the asset has traveled from its origin, remaining distance or estimated time to the destination, and the current location of the asset. Some of the tracking events (e.g., tracking events 408 and 418) can be used to determine that the asset has entered or left a port or other designated area (e.g., because the location is now inside or outside a geofence associated with the designated area).

In this specific example shipment route, as the asset rounds the Cape of Good Hope at the southern tip of Africa, the tag generates a notification for an environmental event 416. The environmental event 416 indicates that a particular environmental condition (e.g., temperature, humidity) has either exceeded or fallen below an acceptable range.

The asset eventually arrives at the destination location 404. The asset is opened before the tag is decommissioned, and the tag generates a notification for a security event 420 indicating that the asset has been opened or tampered with. In some implementations, when the event server 318 receives the security event notification, the event server 318 checks to see if the location of the security event 420 is inside a geofence corresponding to the destination location 402. If so, the event server 318 can automatically determine that the asset's journey has ended. In other implementations, the tag can be decommissioned before it is opened, and the tag can generate a process event notification and send the notification to the event server 318 indicating the end of the journey instead of the security event.

Each event notification described above includes a position fix. The system 302 receives and processes each event notification and provides information to end user systems (e.g., using an information service like the information service 324). The information can include event notifications (e.g., identifying the type of event, the asset, the positional fix, and the date/time of the event). The information can also include additional information extracted from or associated with the event (e.g., a map of the route taken by the asset for a location event, or an association between an event and the contents of an asset associated with the event).

Tag Pool Management System

Example Tag Pool Management System

FIG. 5 illustrates an example tag pool management system 500. The example tag pool management system is an example of the tag pool management system 310 described above with reference to FIG. 3.

The tag pool management system 500 can include portal 502, inventory tracking and planning module 504, inventory orders and forecast module 506, workflow management module 508, shipping system 510, export clearance module 512, and inventory control module 514. These components can be communicatively coupled to one or more of each other. Though the components identified above are described as being separate or distinct, two or more of the components may be combined in a single process or routine. The functional description provided herein, including separation of responsibility for distinct functions, is by way of example. Other groupings or other divisions of functional responsibilities can be made as necessary or in accordance with design preferences. In some implementations, one or more of the modules is separate from the tag pool management system 500, for example, the export clearance module 512 can be included in the customs clearance and export control module 314 described above with reference to FIG. 3, rather than the tag pool management system 500.

The tag pool management system 500 can interact with a variety of other systems, including a tracking manager 516, end users and internal users 517, tag vendors 520 (e.g., companies who sell and optionally repair tags), Subscriber Identity Module (SIM) vendors 522 (e.g., companies who provide the SIM cards for the tags), a disposal 524 (e.g., a place where defective tags can be disposed), customer origin locations 526 (e.g., locations where tags are attached to assets), and customer destination locations 528 (e.g., locations where tags are removed from assets).

The portal 502 can receive end user and internal user requests to provide tags for assets, information about the tags, forecasts, and issues and can provide reports and alerts to the end users and internal users 517. The end users are customers requesting tracking of assets, and the internal users are employees of the tracking system, for example, program managers, TL personnel, and finance department users. For example, end users can request that a particular asset be tracked (and provide requirements for the tracking) through the portal. As another example, TL personnel can request forecast information on demand and supply of tags. Data used to generate the forecasts can include when tags began and ended their journey (from which an estimate of when tags will be available can be generated), as well as carrier booking requests (which are formal requests for a number of containers, from which an estimate of how many tags will be requested can be generated). As another example, internal users or end users can alert the system to tag issues such as when a given tag stops reporting, failures within tags (e.g. electromechanical failures, SIM card failures, etc.), and identification of dead zones in specific trade lanes.

The inventory tracking and planning module 504 is a central repository of tag information including details on tag status and the physical location of tags. The information is based in part on asset reports received from the tracking manager 516. When the inventory tracking and planning module 504 receives a request for a tag, the inventory tracking and planning module 504 determines whether a tag satisfying the request is available. If so, the inventory tracking and planning module 504 sends data to the inventory orders and forecasts module 506 to indicate that a tag has been requested. The inventory tracking and planning module 504 also instructs the workflow management module 508 to send the tag to the origin location for the shipment.

The inventory orders and forecasts module 506 tracks tags that have been ordered and forecasts tag availability based on asset booking information from the tracking manager 516, and the data received from the inventory tracking and planning module 504. The inventory orders and forecasts module 506 can also provide forecasts of inventory availability to the workflow management module 508.

The workflow management module 508 receives data from the inventory tracking and planning module 504 indicating that a tag has been selected to associate with an asset, and receives information from the inventory orders and forecasts module 506 regarding inventory availability. The workflow management module 508 sends work and ship orders to the tag pools 518. The information from the work and ship orders is also sent to the shipping system 510. As the workflow management module 508 receives updates on the work and ship orders (e.g., from the TL Centers 518 and the shipping system 510), the workflow management module 508 updates the inventory tracking and planning module 504 with the current details on the location of the tag.

The shipping system 510 receives information from work and ship orders from the workflow management module 508 and generates the necessary shipping labels for tags that are being shipped to origin locations. For example, the shipping system 510 can use an interface (not shown) to a carrier such as Federal Express that creates tracking numbers and sends the tracking numbers to the tracking system. The shipping system can track the cost of each shipment. Once a tag has been sent to the origin location, the shipping system 510 can send data to the workflow management module 508 indicating that the ship order is complete. In some implementations, before the shipping system ships the tag, the shipping system checks that export clearance has been received for the tag. For example, the shipping system can receive an Export Control Classification Number (ECCN) for the shipment of each tag from the export clearance module 512. The ECCN indicates that a particular tag type has been cleared to travel from the origin location to the destination location for the shipment.

The export clearance module secures export clearance for each tag type that is being used to track an asset as it journey from an origin location to a destination location, and sends the ECCN for the clearance to the shipping system 510.

The inventory control module 514 is a repository of tag parameters such as SIM number, communications provider, firmware version, GPRS server version, sensor module, GPS module, wireless phone number, GPS acquisition interval, GPRS acquisition interval, vendor, dimension, weight, and other miscellaneous configuration parameters such as the number of times the tag can be reused, the expiration date of the tag, or the required battery level of the tag. The inventory control module 514 maintains this information based on data about the tags received from tag vendors 520 and data about SIM costs from the SIM vendors 522. The inventory control module 514 provides needed information to the SIM vendors 522 and information to the shipping system 510.

The tag pools 518 include various sub-modules to process and route tags. The receiving module 530 receives new tags and tag accessories from the tag vendors 520, receives tags from customer origin locations 526 and customer destination locations 528, and receives lost tags that are later found. If there are troubles with the tags, they are sent to be handled by the troubleshoot module 532.

The refurbishment module 534 receives tags from the troubleshoot module 532 and the receiving module 530. If the tags are defective, the refurbishment module 534 sends the tags to the salvage and disposal module 534. If the tags are merely malfunctioning, the refurbishment module 534 sends the tags to either the tag vendors 520 or the depot repair module 536 for repair. The tag vendors 520 and the depot repair module 536 return repaired tags to the tag receiving module 530. The refurbishment module 534 sends repaired tags (and tags that did not need to be refurbished) to the pick and ship module 538, which routes tags to customer origin locations 526.

At the customer origin locations 526, the tags are coupled with assets, and the tags are associated with the assets. For example, a tag can be associated with the asset to which it is coupled by data stored in the tag, data stored in memory of the asset, or data stored in a tag database. Assets (and their tags) can be sent from the customer origin locations 526 to the customer destination locations 528. During the journey, the tracking monitor 516 receives various notifications from the tags (e.g., begin journey notifications, end journey notifications, and various other event notifications).

Example Tag Pool Management Process

Figure 6:
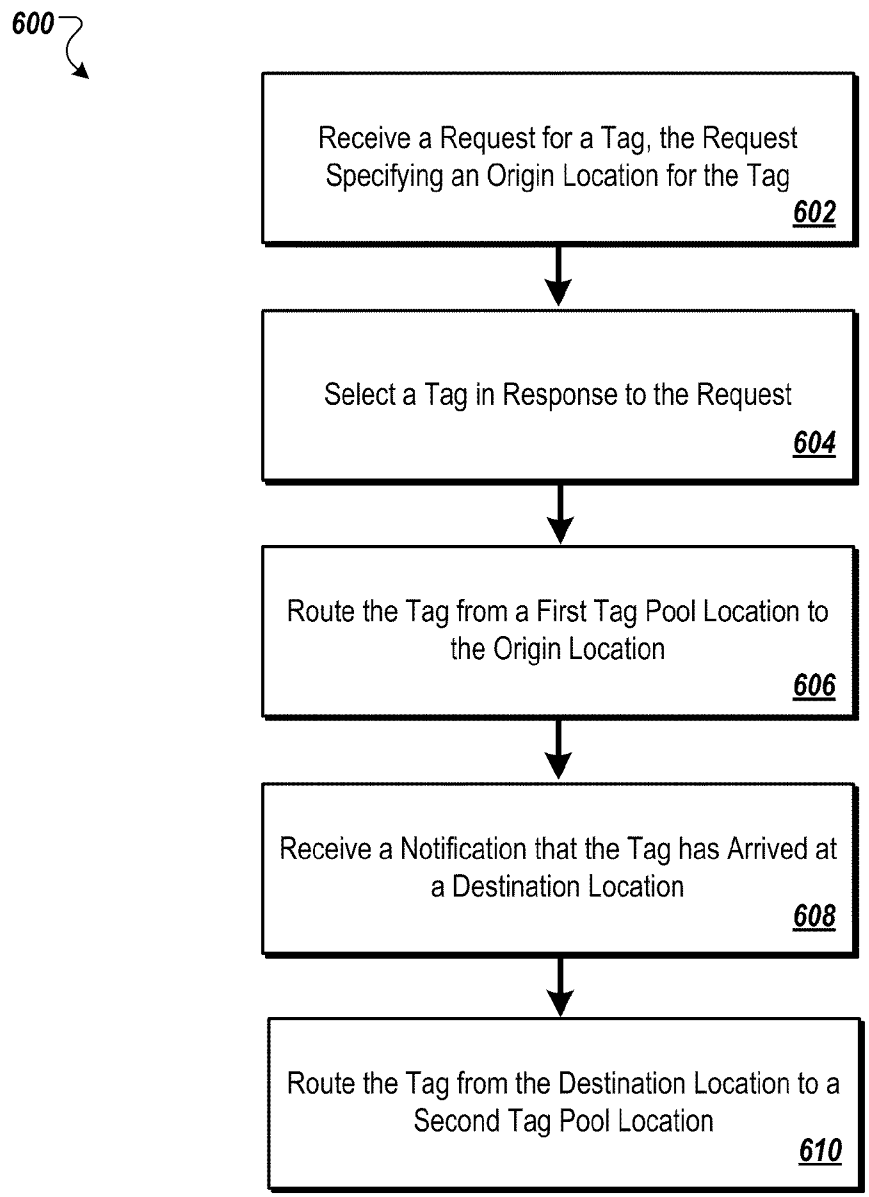
FIG. 6 is a flow diagram of an example process for tag pool management.

FIG. 6 is a flow diagram of an example process 600 for tag pool management. For convenience, the process will be described in reference to a system that performs the process. The system can be, for example, the tag pool management system 500. The steps of process 600 need not occur sequentially or in the order described below.

The system receives a request for a tag, the request specifying a origin location for the tag (602). The system can receive the request, for example, through a portal such as the portal 402. In some implementations, the request specifies a particular type of the tag. In other implementations, the request specifies one or more requirements for the requested tag that the system can use to determine acceptable tag types.

The system selects the tag in response to the request (604). In general, each tag has various properties, including, for example, size of the tag, method of connecting to an asset, monitoring capabilities, battery life, size, weight, methods of communicating with the event server, etc. In various implementations, the system selects a tag of a type whose properties will satisfy the request.

In some implementations, the request specifies one or more monitoring requirements. The monitoring requirements can include, but are not limited to, environmental monitoring requirements, security monitoring requirements, location monitoring requirements, data transfer requirements (e.g., a backhaul interval specifying the frequency of backhauls for event notifications), and an estimated length of the journey. In these implementations, the system selects a tag of a type that can perform the type of monitoring specified by the monitoring requirements. For example, if the monitoring requirements specify that the asset should be monitored for security, and temperature in a specific temperature range, the system selects a tag that monitors for security and temperature, and that can monitor for temperature in the specified range. As another example, if the length of the journey is short, the system can select a tag type with a small battery capacity, while if the length of the journey is long, the system can select a tag type with a larger battery capacity.

In some implementations, the type of tag is selected based on received tag requests and/or forecasted tag requests. For example, if the number of forecasted tag requests and/or the number of received tag requests for a given tag type exceeds the number of tags of that type in inventory, the system can select a tag of a different type that still satisfies the minimum requirements of the given tag type.

In some implementations, the request also specifies an expected configuration of the asset. The expected configuration can specify particular configuration details (e.g., an expected size of the asset, available ways to connect tags to the asset, etc.) or can specify a particular type of asset having a known configuration. In these implementations, the system can select a tag that is capable of being coupled to an asset having that configuration (e.g., that is the correct size for a given asset and that is capable of being connected to the asset).

In some implementations, once (or before) the tag is selected, the system secures export clearance for the tag, for example, as described above with reference to FIG. 5.

In some implementations, once the tag is selected, the system configures the tag. For example, the system can configure the tag in accordance with the monitoring requirements (e.g., to monitor for a specific temperature range). As another example, the system can configure the tag so that the tag has needed cost information for various communication providers to allow the tag to determine what providers to connect to, and optionally what data to send, as described above with reference to FIG. 3.

The system routes the tag from a first tag pool location to the origin location (606). The system routes the tag from the tag pool location to the origin location by arranging for the tag to be sent to the origin location. For example, the system can arrange to ship the tag with a commercial carrier, or otherwise arrange to have the tag delivered. In some implementations, the system receives a notification that the tag has arrived at the origin location (e.g., via a tracking system provided by the carrier transporting the tag) and updates data on the tag (e.g., data maintained by the inventory tracking and planning module 604) to reflect this.

The system receives a notification that the tag has arrived at a destination location (step 608). In some implementations, the notification is an event notification generated by the tag. In other implementations, the notification is sent by one or more computers at the destination location.

The system routes the tag from the destination location to a second tag pool location (610), for example, much as the system routes the tag from the first tag pool location to the origin location. The second tag pool location can be the same as, or different from, the first tag pool location.

In some implementations, the system processes the tag once it is received at the second tag pool location. Processing the tag can include, for example, scanning the tag to identify it (e.g., scanning a barcode on the tag). If the tag is flagged for troubleshooting, the tag can be sent to the troubleshooting module. Processing can further include physically inspecting the tag to determine if it is physically damaged, and doing a health check of the tag (e.g., confirming that all systems on the tag are working correctly). If the tag is damaged or a system is not working correctly, the system can route the tag to a tag repairer. The tag repairer can be internal to the system, or can be an external tag repairer (e.g., a tag vendor). If the system determines the tag is defective, and not merely damaged, the system can dispose of the tag (e.g., by routing it to a tag disposal system).

In some implementations, processing the tag includes doing a backhaul of data stored on the tag. The backhaul of data can be, for example a complete download of all data generated by the tag during the tag's journey, or a partial download of particular types of data, or data generated at particular times. For example, the system can download only data related to security events, or only the most recent three days of data.

In some implementations, the system monitors tag levels at various tag pools. When inventory is low at a given tag pool, the system can initiate a redistribution across tag pools (e.g., by sending tags from a tag pool with extra tags to a tag pool with few tags). If the system determines that the overall tag level is low, the system can initiate manufacturing requests to the tag vendor, in order to increase the overall supply of tags.

Providing Information to Users Based on Asset Locations and Asset Information

Example Information Service Module

Figure 7:
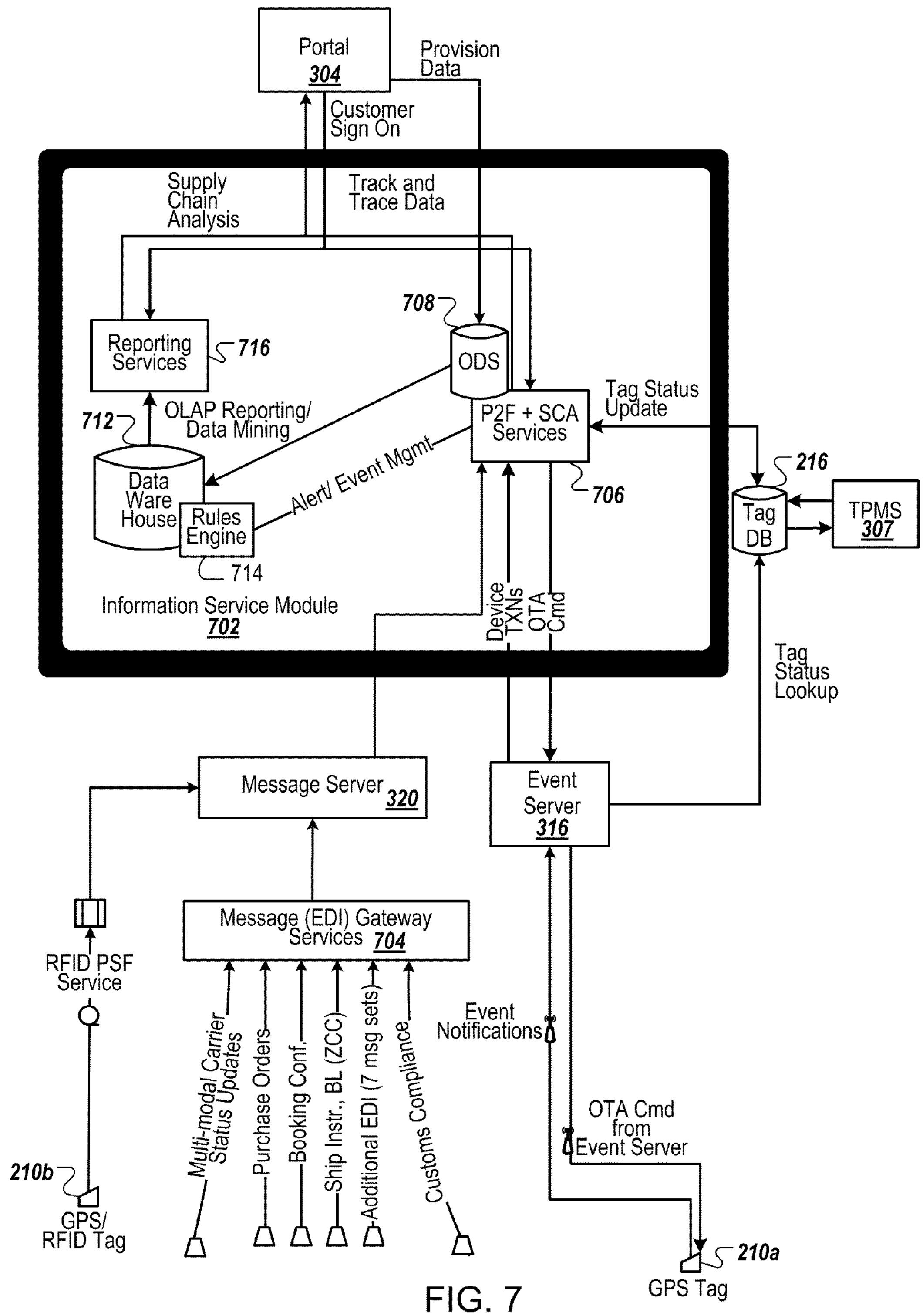
FIG. 7 illustrates an example information service module.

FIG. 7 illustrates an example information service module 702. The example information service module 702 is an example of the information service module 324 described above with reference to FIG. 3. The information service module 702 provides end users with track and trace functionality that allows the end users to track assets as the assets journey from an origin location to a destination location. The information service module 702 can also allow end users to view event notifications for the assets. The information service module 702 can additionally generate one or more supply chain management statistics based on both data from the tags and enterprise data for the end user.

The information service module 700 receives data from four primary sources: portal 304, tag database 216, event server 316, and message server 320. The portal 304 provides an interface through which users can sign onto the system and submit provision data giving an overview of the end user such as a name of the enterprise, how many suppliers the enterprise has, how many end users they have, where the suppliers and end users are, etc. This data can alternatively be provided through the message server 320. The portal 304 also presents track and trace data, event and exception notifications, end-to-end supply chain visibility, risk management information, customs inspection risk scores, and supply chain statistics, for example, generated by the information service module 702.

The tag database 216 is maintained by the TMPS 307 and provides tag status updates to the information service module. The tag status updates can indicate, for example, what asset a given tag is associated with.

The event server 316 receives and processes event notifications from GPS tags (e.g. tag 210*a*) and provides the notifications to the information service module 702. The event server 316 can also send over the air commands from the information service module 702 to the GPS tags.

The message server 320 receives RFID data for RFID enabled tags (e.g., tag 210*b*), for example, from one or more RFID readers at various locations along the tag's journey, such as at one or more ports. The RFID readers receive information from the RFID enabled tags and forward the information to the message server. The forwarding can optionally be done through a server local to the RFID readers that batches and sends the data. The message server 320 also receives various data through the message (EDI) gateway services 704. Messages received through the message (EDI) gateway services 704 can come from various sources including, for example, shipment messages, location status messages, import-export messages, and messages from end users. Shipment messages can include, for example, purchase orders, purchase order changes, advance ship notices, shipping instructions, bill-of-landing, and commercial invoices. Location status messages can include, for example, truck carrier messages, ocean carrier messages, rail carrier messages, ocean vessel latitude and longitude messages (e.g., through either 315 messages or GPS transponders). Import/export messages can include, for example, entry messages, entry summaries, and customs status updates. The messages received through the Message (EDI) Gateway Services 404 can include information purchase orders and additional EDI, shipping instructions, booking data, multi-modal carrier status updates, and customs compliance data. The multi-modal carrier status updates are updates from the conveyances used to transport the asset (e.g., the status of a ship carrying the asset). The multi-modal carriers status updates can include, for example, the status of a conveyance carrying the asset as well as conveyance stow plans indicating where assets are stored on a particular conveyance. The customs compliance data is data related to customs compliance, for example, import and export declaration forms, commercial invoices, hazardous material clearance documents, as well as EDI 350 related information describing what is being carried in the container as well as the customs status.

Much of the data received by the message server 302 is enterprise data, that is, data describing the enterprise shipping the assets, data describing the items in the assets, for example, transaction data for the asset, data describing forecasting and planning information for the enterprise, and data describing the shipment context for the asset.

The enterprise data can provide information on the enterprise itself, including one or more of information on the trade lanes the enterprise uses when shipping assets, information on companies that play an active role in the supply chain for the enterprise, ports, terminals, and stations used in the enterprise's supply chain, users and roles throughout the enterprise, product groups within the enterprise, and products within the enterprise. Details on the trade lanes can include, but are not limited to an identification of the trade lanes, details of locations along the trade lanes, e.g., what ERP system is used, what transportation planning and execution system is used, how EDI messages are generated, what EDI messages are sent and received during the order and delivery process, what visibility the enterprise has of asset movements, who provides the data and/or updates on this visibility, how the enterprise is notified if there is a delay in the movement of the container, whether reports are generated for container volume flows, how many people are involved in tracking orders and/or goods, any current problems the enterprise has in movement of goods, what delays these problems cause, what documents and/or information are prepared and sent to customs, which customs entity the documents are sent to, how often inspections take place (e.g., how many times a month or what percentage of total volume for this trade lane), what interactions the enterprise has with customs, and where the assets clear customs in certain countries. Information on the companies that play an active role in the supply chain for the enterprise include, but is not limited to, names of the companies, descriptions of the companies, locations of the companies, and contact information for the companies. Information about ports, terminals, and stations can include, but is not limited to a type of the site (e.g., is it the end user's site, the supplier's site, a site of the buyer to whom goods are being shipped, or a public site), a transport for the site (e.g., ocean, rail, truck, etc.), a location code for the site (e.g., a United Nations code, or internally generated code), the location of the site (e.g., latitude and longitude), a location name for the site, an address and other contact information for the site, and a radius for the site. Information about users and their roles can include, but is not limited to partner type (e.g., end user, enterprise division, supplier), user id, enterprise id, name, password, functional role within the enterprise, user role within the tracking system (e.g., user, administrator), reporting tool roles (e.g., administrator, developer, analyst, viewer, user, scheduler), country, time zone, contact information, preferred language, and job title. Information about product group describes how products are divided into various categories. For example, product group information can include, but is not limited to, product group code, product group name, and end user division code. Examples of information about products includes, but is not limited to, a code for the product, a description of the product, a group for the product, and a transaction type.

The enterprise data can also include shipment context information for the assets, for example, an expected route that the asset will take, along with dates and times for key milestones in the journey. Shipment context information can also include EDI 315 and EDI 214 status update messages, certificates of origin, export and import certificates, carrier invoices, bills of landing, booking information, shipping instructions, data from non-intrusive inspection systems such as radiation portal monitors, and the customs compliance data and carrier status updates described above.

Enterprise data can also include forecasting and planning information for the enterprise, supplier and vendor information, pricing information, and third party information such as information on end customers of the end user, carriers, forwarding agents, and logistics providers.

The enterprise data can also include transaction data describing a sale or purchase of items in the asset. For example, the transaction data can be purchase orders or invoice data that lists one or more of the items in the asset, the buyer and seller of the items in the asset, and promised dates regarding delivery of the asset (ship by date, deliver by date, etc.). As another example, the transaction data can identify the divisions of the enterprise responsible for the items in the asset. The transaction data can also include, for example, changes to purchase orders, advance ship notices, commercial invoices, financial invoices, financial settlements, letters of credit, and insurance.

The information service module 702 uses the data that it receives to provide two main types of functionality to the end user: track and trace, and supply chain analysis. The information service module 702 consists of purchase order to fulfillment services (P2F+SCA Services) 706, and operational data store (ODS) 708, as well as the data warehouse 712, rules engine 714, and reporting services 716. These components can be communicatively coupled to one or more of each other. Though the components identified above are described as being separate or distinct, two or more of the components may be combined in a single process or routine. The functional description provided herein, including separation of responsibility for distinct functions, is by way of example. Other groupings or other divisions of functional responsibilities can be made as necessary or in accordance with design preferences. In some implementations, one or more of the modules is separate from the information service module 700.

The purchase order to fulfillment services and supply chain analysis services 706 is the main recipient of outside data. The P2F+SCA services 706 receive event notifications from the event server 316, as well as tag data from the tag database 216 and data from the message server 320. The P2F+SCA services 706 stores the most recent data in the operational data store 708 and stores all data in the data warehouse 712. For example, the data warehouse 712 might store all data received by the information service module 702, while the operational data store might store only data received during the past three months. The P2F+SCA services 706 uses the data stored in the operational data store 708 to provide track and trace functionality, allowing end users to view the progress of their assets and see any event notifications that were received for the assets. For example, when an end user connected through the portal 304 asks for the recent tracking history of a particular asset, the P2F+SCA services 706 identifies the tag associated with the asset from the data received from the tag database 216, and uses the data received for that tag that is stored in the operational data store 708 to generate a user interface showing the progress of the asset. The end user can view the resulting user interface through the portal 304. The P2F+SCA services 706 may further use enterprise data from the end user to augment the track and trace notifications, for example, as described below with reference to FIG. 8.

The reporting services 716 allows users (e.g., customers or other users) to query for various supply chain statistics. The reporting services 716 processes the data stored in the data warehouse 712 according to rules specified in the rules engine 714 to generate the requested supply chain statistics. This analysis is described in more detail below, with reference to FIG. 9. The user can view the statistics and other supply chain analysis through the portal 304.

Example Information Service Module Processes

Figure 8:
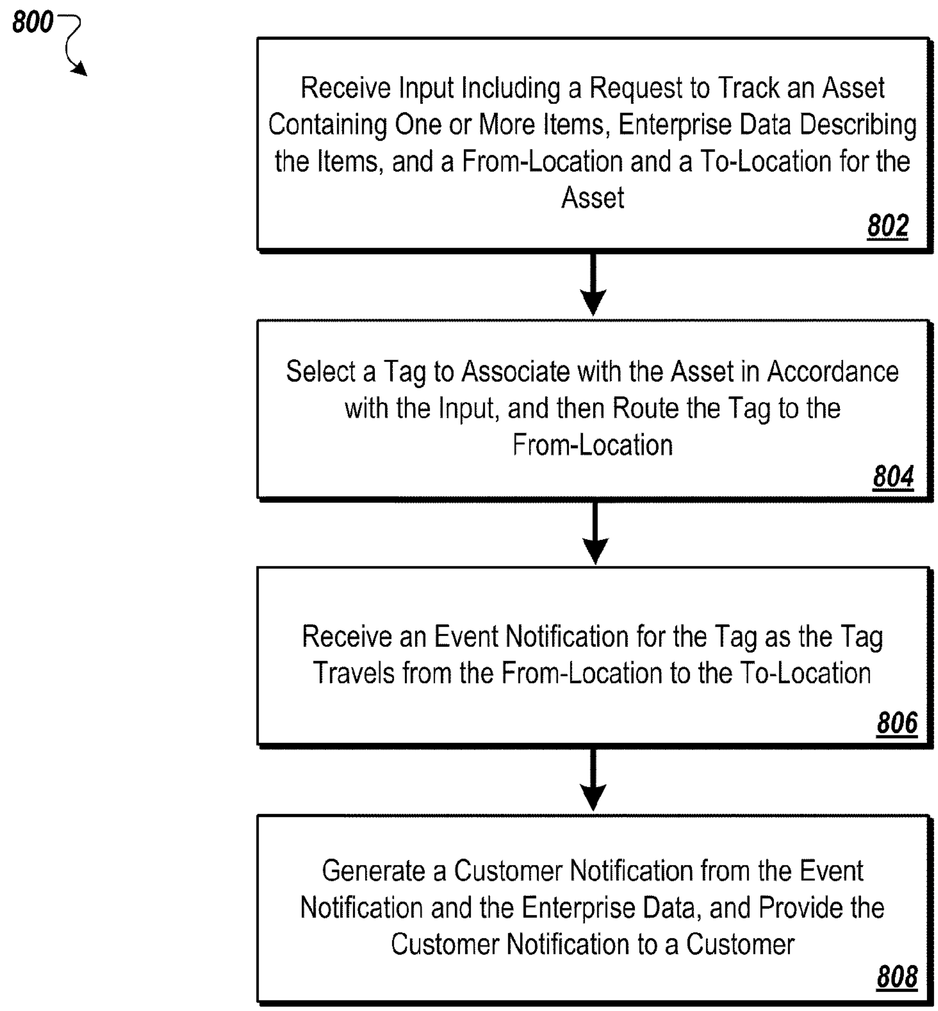
FIG. 8 is a flow diagram of an example process for tracking an asset and providing event notifications to an end user.

FIG. 8 is a flow diagram of an example process 800 for tracking an asset and providing notifications to a user. For convenience, the process will be described in reference to a system that performs the process. The system can be, for example, the tag tracking system 302. The steps of process 800 need not occur sequentially or in the order described below.

The system receives input (802). The input includes a request to track an asset, enterprise data describing the asset, and a origin location and a destination location for the asset.

The input can be received, for example, through the portal 304 described above with reference to FIG. 7. The input can be received as one single input, or as multiple inputs.

The system selects a tag to associate with the asset in accordance with the input, and then routes the tag to the origin location (804), for example, using a tag pool management system (e.g., tag pool management system 600).

The system receives an event notification for the tag as the tag travels from the origin location to the destination location (806), for example, as described above with reference to FIG. 6.

The system generates a user notification from the event notification and the enterprise data, and provides the user notification to a user (808). In some implementations, the user notification can be a report of the event notification, augmented by details extracted from the enterprise data, for example, if the event notification specifies that a security event has occurred, the system can generate a user notification that indicates that the items in the asset were in an asset for which a security event has occurred that an asset on its way to a particular supplier had a security event, that an asset being used to ship items from or to a particular division of the enterprise had a security event, or that an asset used to ship items associated with a particular product had a security event. In some implementations, the user notification also includes a dynamic estimated time of arrival for the asset, calculated, for example, from the data received about the asset's journey and historical lead time information gathered from past journeys along the same route.

In some implementations, the user notification is a customs inspection risk score. The customs inspection risk score predicts whether an asset should be inspected by customs. The customs risk score can be derived from various factors that influence whether the asset should be a customs target. For example, these factors can include the contents of the asset, the locations through which the asset has travelled, whether there was a security event for the asset, and whether individuals involved with the journey of the asset are flagged as suspicious persons (e.g., by being included on a terrorist watch list) Individuals involved with the journey of the asset include, for example, the individuals who requested the asset be shipped, the individuals receiving the asset, the individuals who stuffed the asset, the individuals who sealed the asset, and the individuals who transported the asset. Some contents, and some countries, are more likely to lead to customs inspections than other countries and contents. The system can determine the risk from various contents and various countries, for example, from an analysis of historical data that indicates what types of content are more likely to be inspected, and what countries increase the risk of customs inspection. For example, the system can maintain a list of "low risk," "medium risk" and "high risk" contents, and a list of "low risk," "medium risk" and "high risk" countries. Contents and countries can be placed in the appropriate category, for example, from an analysis of the historical data. Similarly, assets that have had a security event are more likely to be high risk than assets that have not, because the security event indicates that the contents of the asset may have been tampered with. If the individuals associated with the journey of the asset are suspicious, then the asset is higher risk. The system can then generate the customs inspection risk score according to the various factors described above. For example, the system can plug the factors into a formula with pre-determined weights that assigns a risk score to the asset. The weights can be determined, for example, empirically, from an analysis of historical data for assets known to be high risk, and not high risk. The system can provide the customs inspection risk score to an end user, e.g., a user who is tracking the asset, or can provide the customs risk score to customs officials for use in determining whether to inspect the asset.

In some implementations, the user notification includes one or more supply chain management statistics, for example, as described below with reference to FIG. 9. In some implementations, the user notification is a geospatial representation of a journey taken by the asset. For example, the user notification can include an indication of where an asset has traveled on a map.

Figure 9:
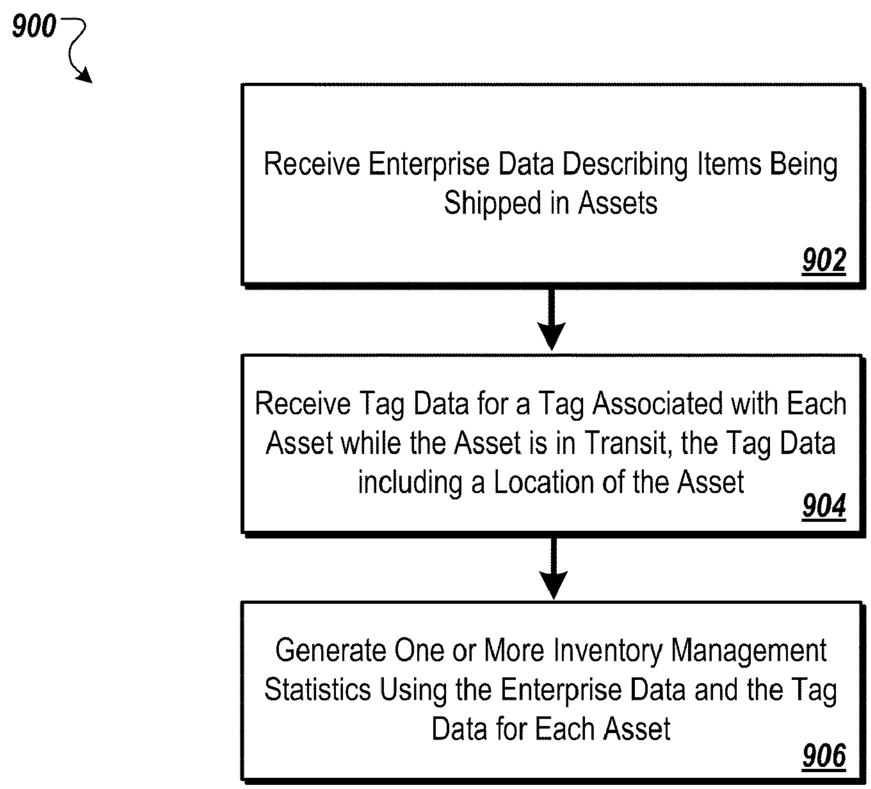
FIG. 9 is a flow diagram of an example process for generating supply chain management statistics.

FIG. 9 is a flow diagram of an example process 900 for generating supply chain management statistics. For convenience, the process will be described in reference to a system that performs the process. The system can be, for example, the tag tracking system 302. The steps of process 900 need not occur sequentially or in the order described below.

The system receives enterprise data describing items being shipped in assets (902). The enterprise data can be received, for example, as described above with reference to FIG. 7. In some implementations, the enterprise data provides information in addition to data describing the items being shipped, for example, as described above with reference to FIG. 7.

The system receives tag data for a tag associated with each asset while the asset is in transit (904) In general, an asset is in transit from the time the tag is commissioned (e.g., coupled to the asset) to the time the tag is decommissioned (e.g., removed from the asset). An asset can be in transit when it is moving, as well as during periods when it is stationary (e.g., when it is sitting in a dockyard waiting to be loaded onto a ship). The tag data includes a location for the asset. In some implementations the tag data is an event notification that identifies an event that occurred at that location. In some implementations, the event itself indicates a physical state of the asset and its contents (e.g., an environmental event indicates a change in the environment for the asset and its contents, and a security event indicates a physical breach of security for the asset and its contents). In other implementations, the tag data includes details on the physical state of the asset (e.g., accelerometer data or velocimeter data for the asset).

The system generates one or more supply chain management statistics using the enterprise data and the tag data for each asset (906). In general, an supply chain management statistic provides an overview (e.g., metrics, computations, visualizations, and control thresholds) of a particular aspect of the enterprise's supply chain. Examples of supply chain management statistics include, but are not limited to, estimated time of arrival for inventory, lead time, fulfillment risk, demand and supply balance, products inbound, perfect order fill rate, shipment fill rate, on-time shipment rate, on-time arrival rate, amount ordered, amount shipped, amount arrived, inventory in-transit, and carrier and vendor performance scorecards.

The estimated time of arrival for an asset (or items in an asset) is the time the system predicts the asset will arrive at its destination. The system can calculate an estimated time of arrival for an item in one of the assets by identifying the asset containing the item, and then calculating an estimated time of arrival for the asset. The estimated time of arrival can be calculated, for example, by using the position fix data received from the tag associated with the asset to determine how far away the asset is from its destination location. In some implementations, the estimated time of arrival is calculated based in part on average travel duration for segments of a journey (e.g., between two ports). The system can determine these average durations by analyzing historical data indicating the amount of time assets were travelling along a given segment. When there is only one route the asset can take, the system can calculate the estimated time of arrival by summing the average travel durations for the segments of the journey. When multiple routes are possible, the system can calculate the estimated length of the journey by calculating a route duration for each potential route by summing the average duration for each of its segments, and then taking a weighted average of the route durations. The route durations can be weighted, for example, based on a likelihood that each route will be taken. The system can determine this likelihood by analyzing historical data on which routes assets have traveled. For example, the weights can be the number of journeys along a particular route between two locations, divided by the total number of journeys along any route between those two locations, or can just be the number of journeys along a particular route between the two locations.

Lead time is the time from when a tag is coupled to an asset (indicating that the journey is beginning) to the time when the tag is uncoupled from the asset at the asset's final destination (indicating that the journey is ending). The system calculates lead time from historical data that is stored for the end user. For example, the system can analyze previous shipments to calculate lead time statistics. To calculate the lead time for an individual item, the system identifies when the tag was coupled to the asset, and when the tag was removed from the asset (e.g., from process event notifications), and then calculates the difference between the two times. The lead times for these individual items can then be combined to calculate various lead time statistics including, for example, average lead time, maximum lead time, minimum lead time, and standard deviation lead time. The system can further calculate lead time for specific classifications of items and shipments, for example, lead times for individual products, individual product groups, divisions within a enterprise, individual suppliers, and locations to where assets are shipped. When an end user is new to the system, there will not be much data for the system to base the lead time calculations on. Therefore, in some implementations, the system can receive historical shipping data from end users and use this data in the lead time calculations.

Fulfillment risk is what an end user stands to lose when orders are not fulfilled on time (e.g., by the time agreed upon by the seller and purchaser). The system can label a given order and/or asset according to the probability that it will not be fulfilled. For example, the system can label the order/asset as one of "likely late," "past due," "exception," or "on time." An orders/asset is "likely late" when the dynamic estimated time of arrival for the order/asset is after the time the order/asset is supposed to arrive. An order/asset is "past due" when it is already past the time the order/asset is supposed to arrive. An order/asset has an "exception" when a security and/or environmental event occurred during the journey. An order/asset is "on time" when the dynamic estimated time of arrival is before or at the time the order is supposed to arrive. Once the orders and/or assets are labeled, the system can allow end users to view the total dollar amount of the items in the orders and/or assets at risk for each label. For example, the system can calculate the total dollar amount that is "likely late." The dollar amount can be further divided according to various classifications of items, for example, individual products, individual product groups, divisions within a enterprise, individual suppliers, locations to where assets are shipped, etc. The system can also allow end users to see the particular purchase orders, products, etc. that are in each risk category. The fulfillment risk allows end users to quickly see how much money they stand to lose in the face of events such as port strikes.

Demand and supply balance measures any difference from the number of items ordered and the number of items shipped. The demand and supply balance can be calculated, for example, by identifying items that were ordered from purchase order data, identifying which assets associated with the items have shipped (e.g., from process event notifications from tags associated with the asset), and then calculating the difference between what has been ordered and what has been shipped. The demand and supply balance can be broken down by various categorizations of the items included in the order. The demand and supply balance allows end users to have an aggregate view of inventory flow, as purchase orders are matched to actual shipments. This can allow end users to reduce historically large swings in inventory, improve downstream efficiency, and reduce time spent administering and correcting imbalances.

Products inbound is the number of items that are in transit. The system can calculate products inbound by identifying which assets are inbound (for example, to a particular location, or to all locations associated with the asset), what date each asset is expected to arrive, and the number of items in the inbound assets that will arrive at each date. The system can further categorize the products inbound by product group, product division, location, supplier, etc.

The perfect order fill rate is the number of orders that were shipped and arrived on time, with no environmental or security exceptions, divided by the total number of orders. The shipment fill rate is the number of items specified in purchase orders that shipped during a given time period, divided by the total number of items specified in the purchase orders during the given time period. The on-time shipment rate is the number of orders (or items) shipped on or before the requested ship data, divided by the total number of orders (or items). The on-time arrival rate is the number of orders (or items) that arrived on time, divided by the total number of orders (or items). Each of these rates can be broken down by various categorizations of the items included in the order and can be calculated for particular time periods.

The amount ordered is a quantity (or dollar amount) of items ordered. Similarly, the amount shipped is a quantity (or dollar amount) of items that were shipped, and the amount arrived is a quantity (or dollar amount) of items that arrived at the destination location. The system can determine which items were shipped and which items arrived by identifying which assets have been shipped or arrived from process event notifications received from the tags, and then identifying the items included in those assets. Inventory in transit is a quantity (or dollar amount) of items that were shipped, but have not yet arrived, and can be calculated by subtracting the number of items that arrived from the number of items that shipped. These amounts can each be broken down by various categorizations of the items.

The carrier scorecards indicate the performance of carriers over time. For example, the scorecard can calculate one or more of the statistics described above, such as lead time, for assets carried by a particular carrier and provide the statistics to the end user as an overview of the carrier's effectiveness. Similarly, vendor scorecards can be generated with vendor-specific statistics.

In some implementations, the system presents a graphical representation of one or more of the supply chain management statistics. For example, the system can present a chart or other diagram that represents the statistics. In other implementations, the system presents a geospatial representation of one or more of the supply chain management statistics. For example, the system can superimpose the supply chain management statistic data on a map to show, for example, statistics by various geographic locations, or various trade routes.

In some implementations, the system presents a search interface to allow users to search for supply chain management statistics by various categorizations of the items for which the statistics are generated, for example, one or more of enterprise division, product group, purchase order, or item. The system can also allow a user to search for supply chain management statistics for items having a particular status (e.g., physical state, location, or estimated time of arrival). The physical state can be, for example, that the items are in an asset that has maintained an environment that has parameters falling within specific thresholds, or thresholds specified for the asset. The physical state can also be that the security of the asset containing the items has or has not been breached. The system can determine the physical state of a particular item by determining whether the tag data for the asset containing the item has included any environmental events or security events. The location is the physical location of the item. The system can determine the physical location of a particular item from the tag data for the asset containing the item. The estimated time of arrival for an asset is described in more details above. In some implementations, the system can further allow a user to search for items associated with a particular purchase order or a particular invoice.

Example User Interfaces

FIGS. 10A-10H illustrate various example user interfaces for providing data generated by the information service module 324 to the end user. These user interfaces can be presented to the end user, for example, in Web forms through a portal, such as the portal 304.

FIG. 10A illustrates an example user interface 1000 for displaying events associated with a particular asset to an end user. The top part of the user interface 1001 displays various containers for which there is available data, including a summary of their status (e.g., a summary of their security status, environmental status, pickup, arrival, last checkpoint, etc.) When the end user selects one of the assets 1002, the bottom half of the user interface 1003 presents the end user with a detailed summary of notifications 1004 received for the asset. The end user can view additional details for the asset, for example, the manifest data (e.g., contents of the asset), by expanding box 1005, and can view associated assets by expanding box 1006.

FIG. 10B illustrates an example user interface 1010 for displaying details for assets associated with particular purchase orders. An end user selects a purchase order 1011 and is then presented with the details of shipment for the purchase order 1012. The details include an individual breakdown of the status 1013 of each asset associated with the purchase order.

Figure 10C:
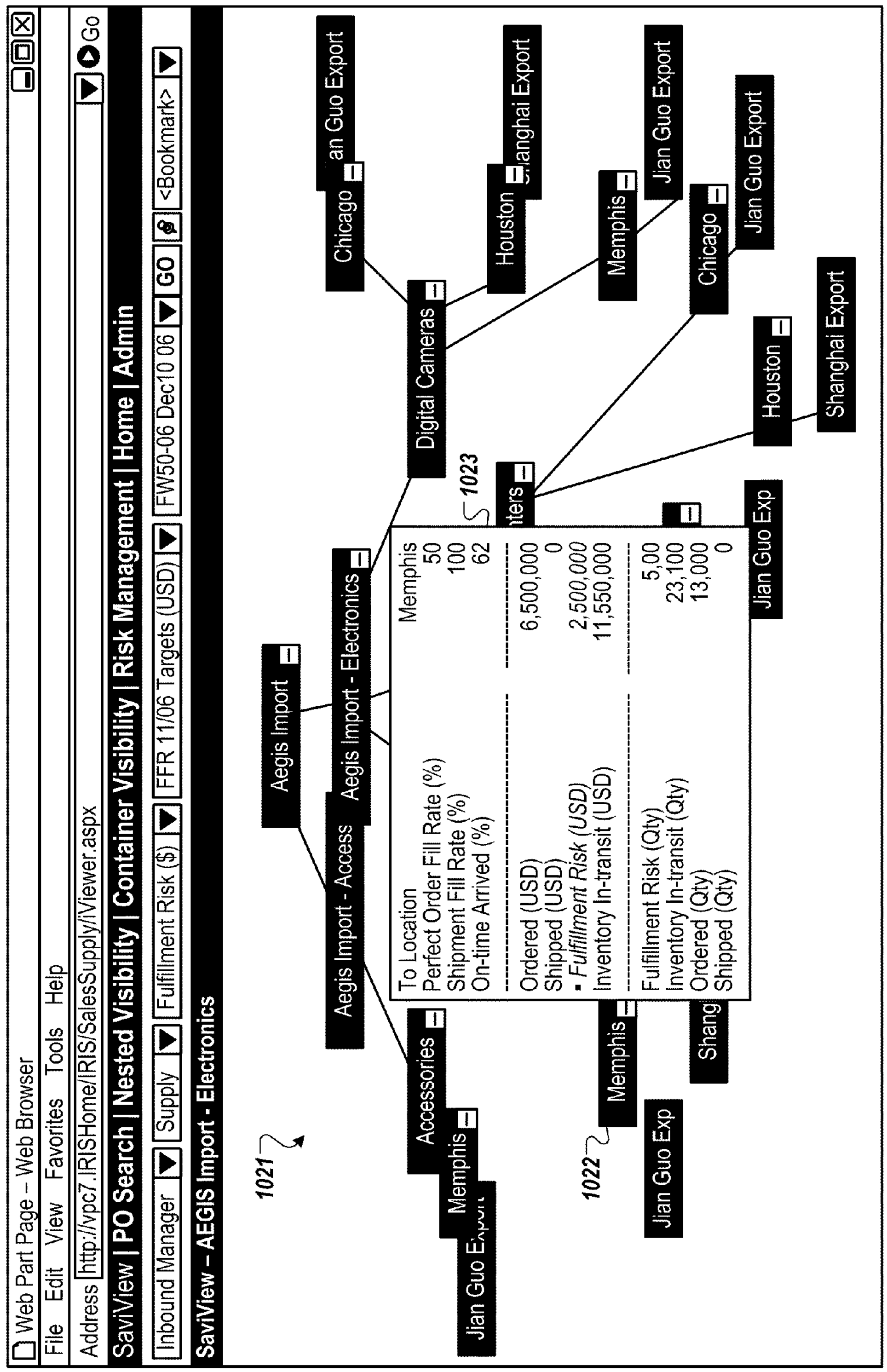

FIG. 10C illustrates a user interface 1020 for displaying supply chain management statistics by enterprise division. The user interface 1020 includes a graph 1021 that illustrates the various divisions of the enterprise. When a end user clicks on division 1022, a box 1023 is presented that includes various supply chain management statistics particular to the clicked-on division.

FIG. 10D illustrates a user interface 1030 for presenting demand supply balance to a end user. The end user can select from various input filters including product group 1031, destination location 1032, product 1033, and minimum shortage 1034. The system then determines output 1035 including the ordered, shipped, and shortage numbers for each product satisfying the input filters at various dates, and provides them to the end user. The output 1035 includes separate columns for various dates (e.g., 1036 and 1037) and also includes the supplier name 1038 and destination location 1039. Additional information can also be included.

Figure 10E:
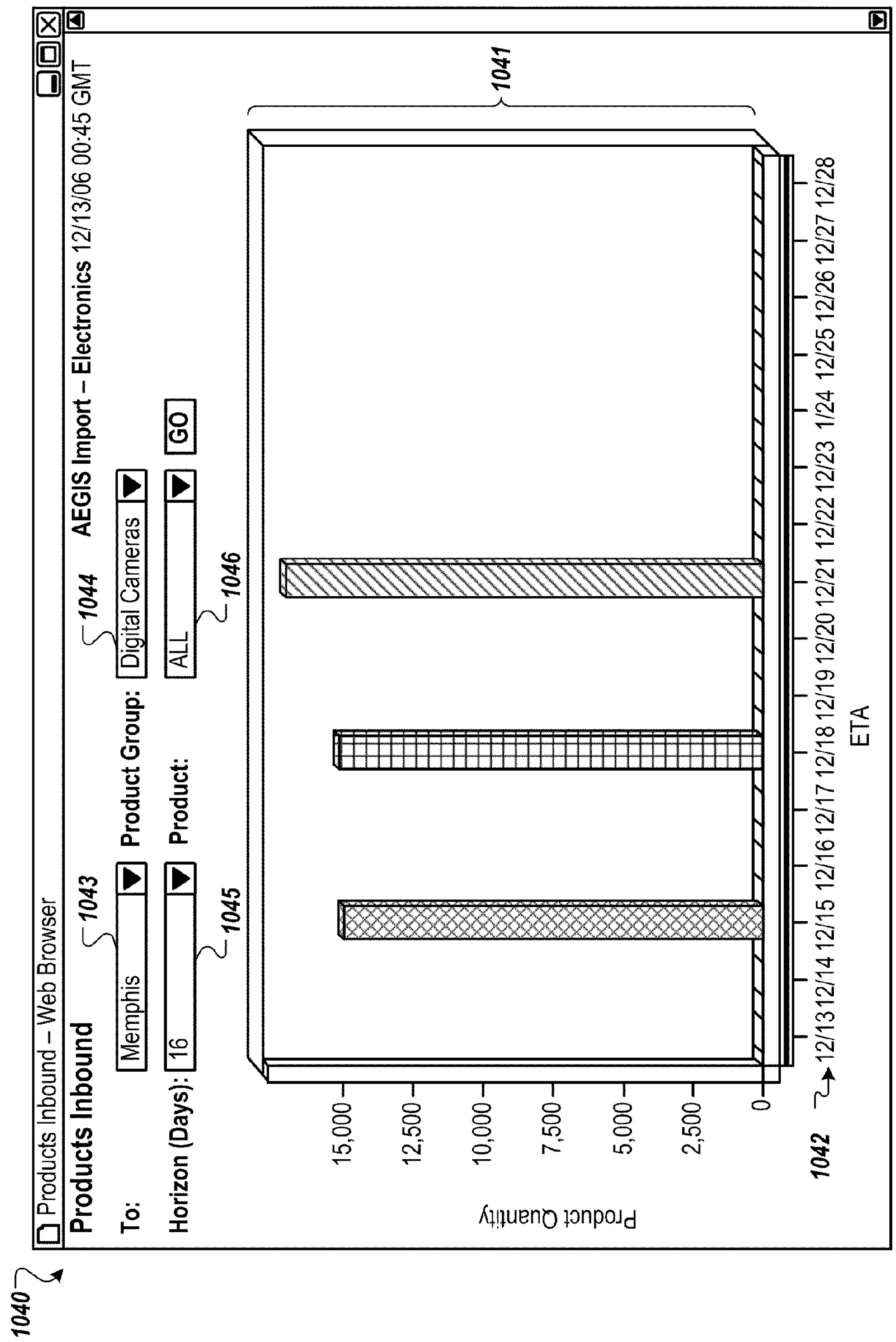

FIG. 10E illustrates an example user interface 1040 for displaying a graphic representation of an supply chain management statistic to a end user. The user interface 1040 includes a graph 1041 showing products inbound at different dates 1042. The end user can further refine what is shown on the graph by specifying one or more of the destination location 1043, the product group 1044, the horizon (e.g., number of days shown) 1045, or the products of interest 1046.

FIG. 10F illustrates an example user interface 1050 for displaying lead time statistics to an end user. Various lead time statistics 1051 are provided to the end user. The end user can also drill down to see the specific details 1052 for each segment of a journey. The end user can specify the parameters under which the statistics are calculated using the input boxes 1053.

FIG. 10G illustrates an example user interface 1060 for displaying fulfillment risk to an end user. The end user can use the drop down menus 1061 to specify parameters for calculating the fulfillment risk, including the particular type of risk 1062 the end user is interested in. The user interface then displays details 1063 of the shipments at risk.

FIG. 10H illustrates an example user interface 1070 for allowing a end user to search events by purchase order number. The end user searches for a purchase order number (or part of a purchase number order) entered in the box 1071. Purchase orders satisfying the query are presented along with a summary of their shipping status, purchase order status, destination location, and supplier at 1072. When a end user selects a purchase order, additional details for the items in the purchase order are displayed. For example, the items in the purchase order are listed at 1073, the details of the shipment order are listed at 1074, and any events for assets including the items in the purchase order are listed at 1075.

The features described above can be implemented in digital electronic circuitry, or in computer hardware, firmware, software, or in combinations of them. The features can be implemented in a computer program product tangibly embodied in a computer readable medium, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:

receiving a first request for a tag device, the first request specifying a first origin location where the tag device will be coupled to an asset and one or more monitoring requirements for the tag device;

selecting a tag device from one or more tag devices in a tag pool in response to the request;

configuring the selected tag device to monitor the asset based on the monitoring requirements;

routing the tag device from a first tag pool location to the first origin location;

receiving a notification that the tag device has arrived at a destination location where the tag device is decoupled from the asset;

routing the tag device from the destination location to a second tag pool location;

receiving a second request for a tag device, the request specifying a second origin location; and routing the tag device to the second origin location in response to the second request.

2. The method of claim 1, wherein the monitoring requirements specify a temperature threshold.

3. The method of claim 1, wherein the monitoring requirements specify a backhaul interval.

4. The method of claim 1, further comprising processing the tag device once the tag device arrives at the second tag pool location.

5. The method of claim 4, wherein processing the tag device includes doing a backhaul of data stored on the tag device.

6. The method of claim 4, wherein processing the tag device includes doing a health check of the tag device.

7. The method of claim 1, further comprising determining that a tag device in the tag pool is damaged, and then routing the damaged tag device to a tag repairer.

8. The method of claim 1, further comprising determining that a tag device in the tag pool is defective, and then disposing of the defective tag device.

9. The method of claim 1, wherein selecting the tag device includes using received tag requests and forecasted tag requests to select the tag device.

10. The method of claim 1, further comprising obtaining export clearance for the selected tag device.

11. A tag pool management system comprising:

a request module configured to receive a request for a tag device, the request specifying an origin location where the tag device will be coupled to an asset and one or more monitoring requirements for the tag device;

a tag selection module configured to select a tag device from one or more tag devices in a tag pool in response to the request and configure the selected tag to monitor the asset based on the monitoring requirements;

a tag routing module configured to route the tag device from a first tag pool location to the origin location, and to route the tag device from a destination location to a second tag pool location; and a notification module configured to receive a notification that the tag device has arrived at the destination location where the tag device is decoupled from the asset.

* * * * *